United States Patent
Ito et al.

(10) Patent No.: US 12,437,669 B2
(45) Date of Patent: Oct. 7, 2025

(54) INFORMATION PROCESSING METHOD, INFORMATION PROCESSING SYSTEM, AND RECORDING MEDIUM

(71) Applicant: Yamaha Corporation, Hamamatsu (JP)

(72) Inventors: Rie Ito, Tokyo (JP); Yukako Hioki, Hamamatsu (JP); Keisuke Arii, Tokyo (JP); Jun Inoue, Komae (JP); Osamu Ohshima, Tokyo (JP)

(73) Assignee: Yamaha Corporation, Hamamatsu (JP)

( * ) Notice: Subject to any disclaimer, the term of this patent is extended or adjusted under 35 U.S.C. 154(b) by 297 days.

(21) Appl. No.: 18/127,095

(22) Filed: Mar. 28, 2023

(65) Prior Publication Data

US 2023/0230493 A1    Jul. 20, 2023

Related U.S. Application Data

(63) Continuation of application No. PCT/JP2021/032463, filed on Sep. 3, 2021.

(30) Foreign Application Priority Data

Sep. 30, 2020    (JP) ................. 2020-164979

(51) Int. Cl.
    *G09B 15/00*    (2006.01)
    *G06V 10/774*    (2022.01)
    *G06V 40/20*    (2022.01)

(52) U.S. Cl.
    CPC ........... *G09B 15/00* (2013.01); *G06V 10/774* (2022.01); *G06V 40/20* (2022.01)

(58) Field of Classification Search
    CPC ....... G09B 15/00; G06V 40/20; G06V 10/774
    See application file for complete search history.

(56) References Cited

U.S. PATENT DOCUMENTS

| | | | |
|---|---|---|---|
| 2013/0236869 A1* | 9/2013 | Sakazaki | G09B 5/04 434/247 |
| 2021/0104169 A1 | 4/2021 | Si | |
| 2021/0104213 A1 | 4/2021 | Furuya et al. | |
| 2022/0398937 A1* | 12/2022 | Furuya | G09B 5/06 |
| 2023/0230493 A1* | 7/2023 | Ito | G10H 1/00 84/470 R |

(Continued)

FOREIGN PATENT DOCUMENTS

| | | | | |
|---|---|---|---|---|
| CN | 108962279 A | * | 12/2018 | ............ G10L 25/18 |
| JP | 10-63175 A | | 3/1998 | |
| JP | 3849598 B2 | * | 11/2006 | |

(Continued)

OTHER PUBLICATIONS

English translation of document C2 (Japanese-language Written Opinion (PCT/ISA/237), filed on Mar. 28, 2023) issued in PCT Application No. PCT/JP2021/032463 dated Nov. 16, 2021 (five (5) pages).

(Continued)

*Primary Examiner* — Robert W Horn
(74) *Attorney, Agent, or Firm* — Crowell & Moring LLP

(57) ABSTRACT

A computer-implemented information processing method includes receiving image information indicative of imagery of a first player using a musical instrument, and determining comment information indicative of a comment for the first player based on the image information.

14 Claims, 10 Drawing Sheets

(56) References Cited

U.S. PATENT DOCUMENTS

2024/0321012 A1* 9/2024 Miura .................. G06V 40/174

FOREIGN PATENT DOCUMENTS

| | | | | |
|---|---|---|---|---|
| JP | 2018049173 A | * | 3/2018 | |
| WO | WO-2009101703 A1 | * | 8/2009 | ........... G10H 1/0008 |
| WO | WO 2019/130755 A1 | | 7/2019 | |
| WO | WO-2023181570 A1 | * | 9/2023 | ......... G02B 27/0172 |

OTHER PUBLICATIONS

Japanese-language Office Action issued in Japanese Application No. 2022-553716 dated Oct. 17, 2023, with English translation (10 pages).

International Search Report (PCT/ISA/210) issued in PCT Application No. PCT/JP2021/032463 dated Nov. 16, 2021 with English translation (five (5) pages).

Japanese-language Written Opinion (PCT/ISA/237) issued in PCT Application No. PCT/JP2021/032463 dated Nov. 16, 2021 (five (5) pages).

Hirano et al, "A Consideration and Implementation of Display Method of Practice Result in Self Learning System for Novice Drummer", IEICE Technical Report, Nov. 7, 2014, pp. 19-24, vol. 114, No. 305, with English abstract (10 pages).

* cited by examiner

FIG. 9
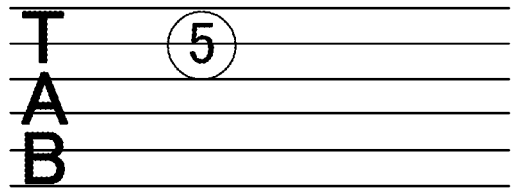
FIG. 10
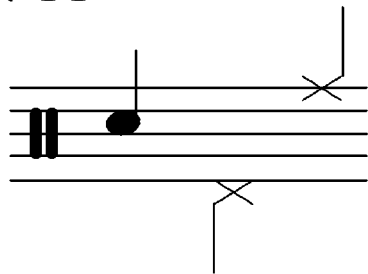
FIG. 11
FIG. 12
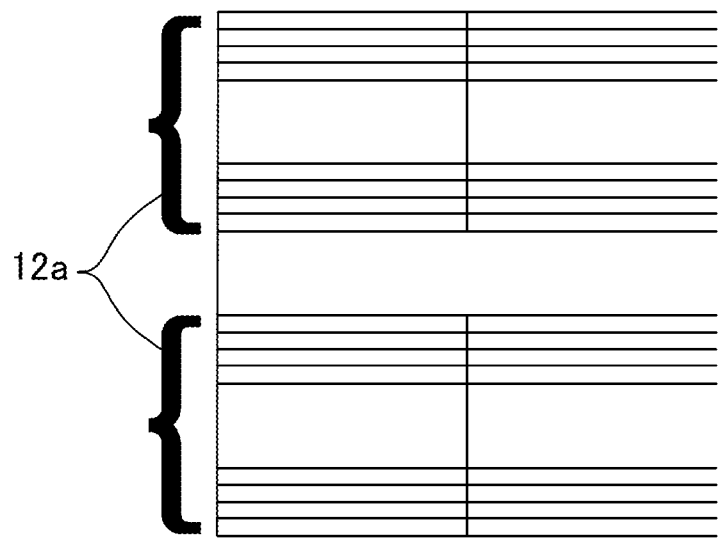

FIG. 13
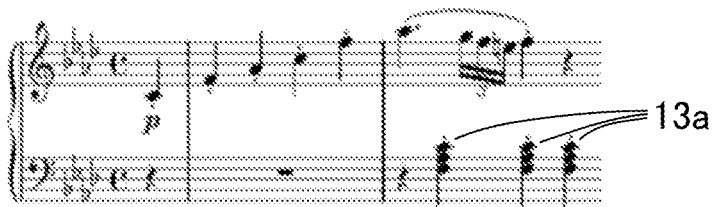
FIG. 14
| TIME PERIODS | LESSON |
|---|---|
| 13:00～14:00 | [PIANO] LESSON |
| 14:00～15:00 | [FLUTE] LESSON |
| 15:00～16:00 | [VIOLIN] LESSON |
FIG. 15
| DATES | LESSON |
|---|---|
| 6/1 | [PIANO] LESSON |
| 6/2 | [FLUTE] LESSON |
| 6/3 | [VIOLIN] LESSON |
FIG. 16
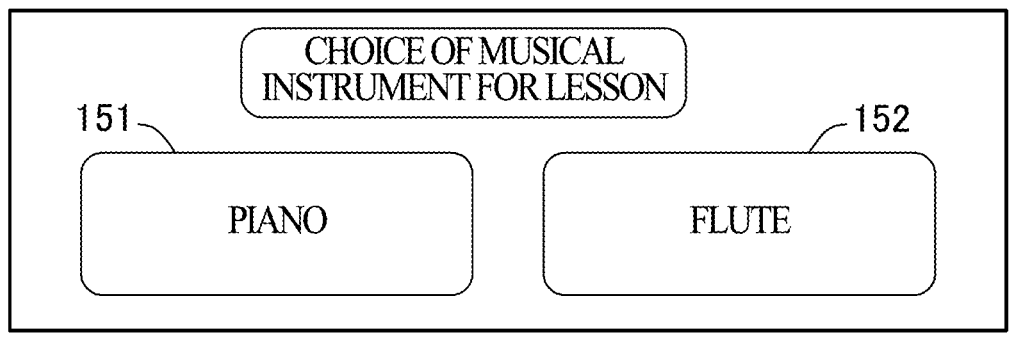

INFORMATION PROCESSING METHOD, INFORMATION PROCESSING SYSTEM, AND RECORDING MEDIUM

CROSS REFERENCE TO RELATED APPLICATIONS

This application is a Continuation Application of PCT Application No. PCT/JP2021/032463, filed on Sep. 3, 2021, and is based on, and claims priority from, Japanese Patent Application No. 2020-164979, filed on Sep. 30, 2020, the entire contents of which are incorporated herein by reference.

FIELD

This disclosure relates to an information processing method, to an information processing system, and to a recording medium.

BACKGROUND

Japanese Patent Application Laid-Open Publication No. H10-63175 discloses a performance evaluation apparatus that automatically evaluates playing of a musical instrument. The performance evaluation apparatus receives a sound signal indicative of sounds from a musical apparatus operated by a player. The performance evaluation apparatus transmits an evaluation signal, which is based on a difference between the sound signal indicative of the sounds and a musical score signal indicative of a musical score, to the musical apparatus. As a method for providing a player of a musical instrument with information on playing of the musical instrument, a method for providing the player with comment information indicative of a comment on playing of the musical instrument is considered. It is important that the comment information indicate an appropriate comment.

SUMMARY

An object of one aspect of this disclosure is to provide a technique for determining comment information indicative of an appropriate comment.

In one aspect, a computer-implemented information processing method includes: receiving image information indicative of imagery of a first player using a musical instrument; and determining comment information indicative of a comment for the first player based on the image information.

In another aspect, an information processing system includes: at least one memory configured to store instructions; and at least one processor configured to implement the instructions to determine, based on image information indicative of imagery of a first player using a musical instrument, comment information indicative of a comment for the first player.

In yet another aspect, a recording medium is a non-transitory computer-readable recording medium storing a program executable by at least one processor to execute an information processing method, and the method includes: receiving image information indicative of imagery of a first player, the first player using a musical instrument; and determining comment information indicative of a comment for the first player based on the image information.

BRIEF DESCRIPTION OF THE DRAWINGS

FIG. 9 is a diagram showing an example of tablature.

FIG. 10 is a diagram showing an example of a guitar chord chart.

FIG. 11 is a diagram showing an example of a drum score.

FIG. 12 is a diagram showing an example of a score for a duet.

FIG. 13 is a diagram showing an example of a musical notation indicative of simultaneous production of plural sounds.

FIG. 14 is a diagram showing an example of a schedule indicated by schedule information.

FIG. 15 is a diagram showing another example of the schedule indicated by the schedule information.

FIG. 16 is a diagram showing an example of a user interface.

DETAILED DESCRIPTION OF THE EMBODIMENTS

A: First Embodiment

A1: Information Processing System 1

Figure 1:
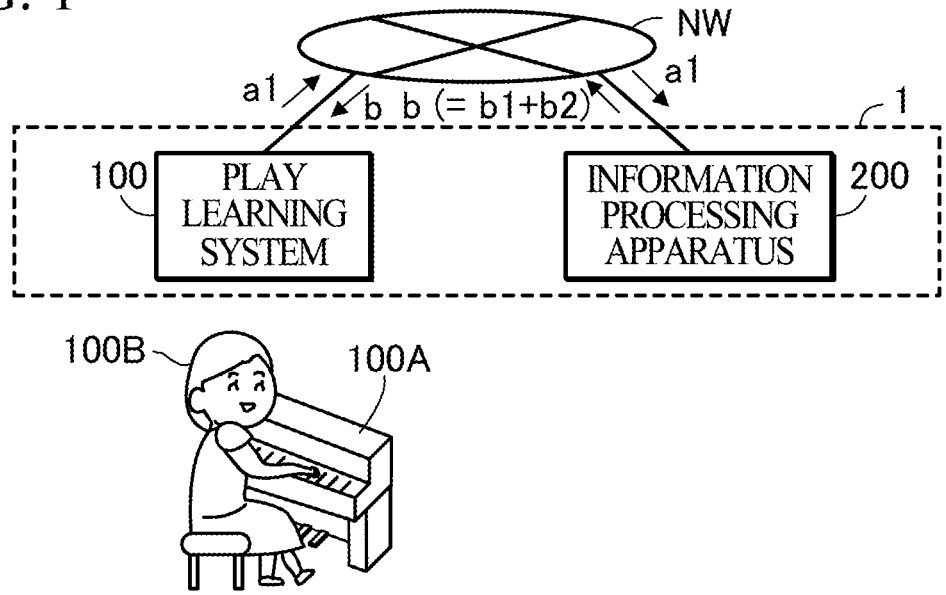
FIG. 1 is a diagram showing an example of an information processing system 1.

FIG. 1 is a diagram showing an example of an information processing system 1 according to this disclosure. The information processing system 1 is used by a user 100B. The user 100B learns how to play a musical piece N on a musical instrument 100A. The musical instrument 100A is a piano. The piano is an example of a type of musical instrument, and is an example of a musical instrument. In the following, "type of musical instrument" may simply read as "musical instrument." The user 100B is a student at an online music school. The user 100B learns how to play the musical instrument 100A online. The user 100B is not limited to the student at the online music school. The user 100B may be a person (other than students at the online music school) who wishes to improve his or her playing of the musical instrument 100A. The user 100B is an example of a first player.

The information processing system 1 provides the user 100B with comment information b. The comment information b indicates a comment for the user 100B playing the musical instrument 100A. The information processing system 1 includes a play learning system 100 and an information processing apparatus 200. The play learning system 100 and the information processing apparatus 200 are able to communicate with each other via a network NW.

The play learning system 100 is located in a room managed by a business operator. The business operator runs the online music school. Alternatively, the play learning system 100 may be located in a place different from the room managed by the business operator. For example, the play learning system 100 may be located in a house of the user 100B.

The musical instrument 100A is played by the user 100B at a predetermined position in the room in which the play learning system 100 is located. Thus, the user 100B playing the musical instrument 100A, the user 100B immediately before playing the musical instrument 100A, and the user 100B immediately after playing the musical instrument 100A can be captured by a fixed camera.

The play learning system 100 transmits user image information a1 to the information processing apparatus 200. The user image information a1 indicates imagery representative of a state in which the user 100B plays the musical piece N on the musical instrument 100A. The imagery indicated by the user image information a1 may be referred to as a "user image." The user image information a1 is an example of image information indicative of imagery of a first player (user 100B) using a musical instrument (musical instrument 100A).

The information processing apparatus 200 is a server, for example. The information processing apparatus 200 is not limited to the server. The information processing apparatus 200 may be a personal computer or a workstation, for example. The information processing apparatus 200 receives the user image information a1 from the play learning system 100. The information processing apparatus 200 transmits the comment information b, which corresponds to the user image information a1, to the play learning system 100.

The comment information b indicates a play comment. The play comment is a comment for the first player (user 100B). For example, the play comment is a comment corresponding to the user image indicated by the user image information a1. The play comment includes, for example, a comment "Release key quickly," a comment "Attention to chord error," or a comment "Stretch your fingers a little more." The play comment is not limited to the comments described above and may be changed as appropriate. The play comment is an example of advice on use of the first player's body (the body of the user 100B) in relation to the musical instrument (musical instrument 100A).

The comment information b includes comment image information b1 and comment sound information b2. Alternatively, the comment information b may include the comment image information b1, and not include the comment sound information b2. Alternatively, the comment information b may include the comment sound information b2, and not include the comment image information b1. The comment image information b1 indicates imagery representative of the play comment. The comment image information b1 indicates, for example, imagery representative of text of the play comment, or alternatively, the comment image information b1 may indicate imagery representative of a musical score on which the play comment is written. The comment sound information b2 indicates sounds (for example, voice sounds) representative of the play comment.

The play learning system 100 receives the comment information b from the information processing apparatus 200. The play learning system 100 displays the play comment based on the comment image information b1 included in the comment information b. The play learning system 100 emits sounds representative of the play comment based on the comment sound information b2 included in the comment information b.

A2: Play Learning System 100

Figure 2:
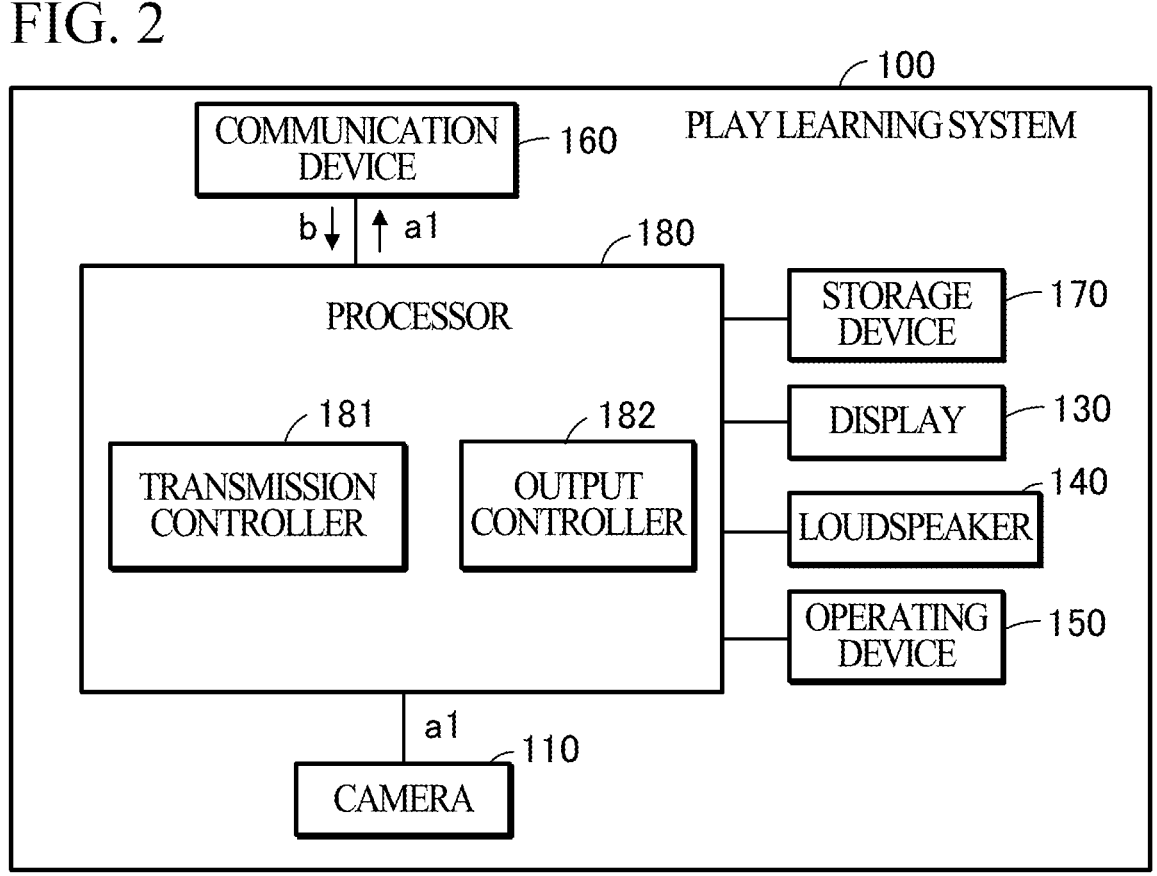
FIG. 2 is a diagram showing an example of a play learning system 100.

FIG. 2 is a diagram showing an example of the play learning system 100. The play learning system 100 includes a camera 110, a display 130, a loudspeaker 140, an operating device 150, a communication device 160, a storage device 170, and a processor 180.

The camera 110 includes an image sensor. The image sensor is configured to convert light into an electrical signal. The image sensor is a charge coupled device (CCD) image sensor or a complementary metal oxide semiconductor (CMOS) image sensor, for example.

The camera 110 generates the user image information a1 by capturing fingers of the user 100B during playing of the musical piece N on the musical instrument 100A (piano). In this case, the user image information a1 indicates imagery in which the musical instrument 100A and fingers of the user 100B during playing of the musical piece N on the musical instrument 100A are represented. The user image information a1 may indicate an object, such as a musical score, different from either the musical instrument 100A or fingers of the user 100B. The orientation of the camera 110 is adjustable. The camera 110 may be referred to as an image capture device.

The display 130 is a liquid crystal display. The display 130 is not limited to a liquid crystal display. The display 130 may be an organic light emitting diode (OLED) display, for example. The display 130 may be a touch panel. The display 130 displays various kinds of information. The display 130 displays a comment image based on the comment image information b1, for example. The comment image is imagery representative of the play comment.

The loudspeaker 140 emits various kinds of sounds. The loudspeaker 140 emits a comment sound based on the comment sound information b2, for example. The comment sound is a sound representative of the play comment.

The operating device 150 may be a touch panel, but is not limited to the touch panel. The operating device 150 may include various operation buttons. The operating device 150 receives various kinds of information from the user 100B.

The communication device 160 communicates with the information processing apparatus 200 via the network NW either by wire or wirelessly. The communication device 160 may communicate with the information processing apparatus 200 either by wire or wirelessly, but not via the network NW. The communication device 160 transmits the user image information a1 to the information processing apparatus 200. The communication device 160 receives the comment information b from the information processing apparatus 200.

The storage device 170 is a recording medium readable by a computer (for example, a non-transitory recording medium readable by a computer). The storage device 170 includes one or more memories. The storage device 170 includes a nonvolatile memory and a volatile memory, for example. The nonvolatile memory includes a read only memory (ROM), an erasable programmable read only memory (EPROM), and an electrically erasable programmable read only memory (EEPROM), for example. The volatile memory includes a random access memory (RAM), for example.

The storage device 170 stores a program and various kinds of data. The storage device 170 may store a program that is read from a storage device in a server (not shown). In this case, the storage device in the server is an example of a recording medium that is readable by a computer (for example, a non-transitory recording medium readable by a computer).

The processor 180 includes one or more central processing units (CPUs). The one or more CPUs are included in examples of one or more processors. The processor and the CPU are each examples of a computer. One, some, or all of functions of the processor 180 may be realized by circuitry, such as a digital signal processor (DSP), an application specific integrated circuit (ASIC), a programmable logic device (PLD), or a field programmable gate array (FPGA).

The processor 180 reads the program from the storage device 170. The processor 180 executes the program to function as a transmission controller 181 and an output controller 182.

The transmission controller 181 controls the communication device 160. For example, the transmission controller 181 transmits the user image information a1 to the information processing apparatus 200 by controlling the communication device 160.

The output controller 182 controls the display 130 and the loudspeaker 140. For example, the output controller 182 causes the display 130 to display the comment image based on the comment image information b1. The output controller 182 causes the loudspeaker 140 to emit the comment sound based on the comment sound information b2.

A3: Information Processing Apparatus 200

Figure 3:
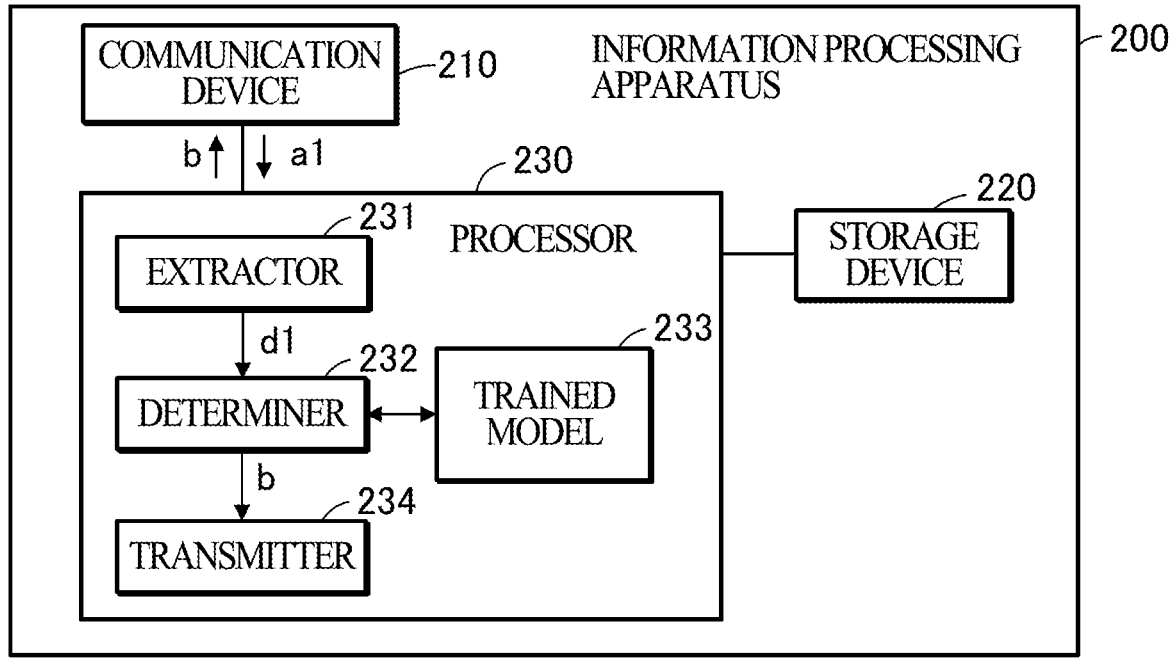
FIG. 3 is a diagram showing an example of an information processing apparatus 200.

FIG. 3 is a diagram showing an example of the information processing apparatus 200. The information processing apparatus 200 includes a communication device 210, a storage device 220, and a processor 230.

The communication device 210 communicates with the play learning system 100 via the network NW either by wire or wirelessly. The communication device 210 may communicate with the play learning system 100 either by wire or wirelessly, but not via the network NW. The communication device 210 receives the user image information a1 from the play learning system 100. The communication device 210 transmits the comment information b to the play learning system 100.

The storage device 220 is a recording medium readable by a computer (for example, a non-transitory recording medium readable by a computer). The storage device 220 includes one or more memories. The storage device 220 includes a nonvolatile memory and a volatile memory, for example.

The storage device 220 stores a processing program, an arithmetic program, and various kinds of data. The processing program defines an operation of the information processing apparatus 200. The arithmetic program defines an operation for identifying output Y1 from input X1.

The storage device 220 may store a processing program and an arithmetic program that are read from a storage device in a server (not shown). In this case, the storage device in the server is an example of a recording medium that is readable by a computer (for example, a non-transitory recording medium readable by a computer). The various kinds of data include multiple variables K1 described below.

The processor 230 includes one or more CPUs. One, some, or all of the functions of the processor 230 may be realized by circuitry, such as a DSP, an ASIC, a PLD, an FPGA.

The processor 230 reads the processing program and the arithmetic program from the storage device 220. The processor 230 executes the processing program to function as an extractor 231, a determiner 232, and a transmitter 234.

The processor 230 functions as a trained model 233 by using the multiple variables K1 while executing the arithmetic program.

The extractor 231 receives the user image information a1. The extractor 231 extracts finger image information d1 from the user image information a1. The finger image information d1 indicates imagery representative of how to use fingers of the user 100B in relation to keys of the piano that is the musical instrument 100A. For example, the finger image information d1 indicates imagery representative of finger movements of the user 100B in relation to the keys of the piano. The finger image information d1 is an example of feature information indicative of how to use (movements of) the first player's body (the body of the user 100B) in relation to the musical instrument (the musical instrument 100A). How to use (movements of) the first player's body in relation to the musical instrument is an example of a relationship between the first player (user 100B) and the musical instrument (the musical instrument 100A). Here, "relationship" refers to a positional relationship between the first player (user 100B) and the musical instrument (the musical instrument 100A).

The extractor 231 identifies the finger image information d1 from the user image information a1 by using an image recognition technique for recognizing imagery of fingers of a person during playing of keys of a piano, for example. In the image recognition technique, for example, a trained model is used. The trained model has been trained to learn a relationship between image information that indicates imagery representative of fingers of a person during playing of keys of a piano, and information that indicates that an object indicated by the image information is fingers of a person during playing of keys of a piano. The extractor 231 extracts the identified finger image information d1 from the user image information a1.

The extractor 231 may use bone information as the finger image information d1. The bone information indicates imagery representative of movements of bones of fingers of the user 100B in relation to the keys of the piano (musical instrument 100A). In this case, the extractor 231 first identifies finger information from the user image information a1 by using the image recognition technique. The finger information indicates imagery of fingers of a person playing the keys of the piano. Then, the extractor 231 extracts the identified finger information from the user image information a1. Then, the extractor 231 identifies the bone information from the identified finger information. For example, the extractor 231 identifies, as the bone information, information output from a trained model in response to the identified finger information being input into the trained model. The trained model has been trained to learn a relationship between first training information and second training information. The first training information indicates imagery of fingers of a person playing the keys of the piano. The second training information indicates imagery of bones of fingers indicated by the first training information.

The determiner 232 determines the comment information b based on the finger image information d1. For example, the determiner 232 uses the trained model 233 to determine the comment information b.

The trained model 233 includes a neural network. For example, the trained model 233 includes a deep neural network (DNN). The trained model 233 may include a convolutional neural network (CNN), for example. The deep neural network and the convolutional neural network are each an example of a neural network. The trained model 233 may include a combination of multiple types of neural networks. The trained model 233 may include additional elements such as a self-attention mechanism. The trained model 233 may include a hidden Markov model (HMM) or a support vector machine (SVM), and not include a neural network.

The trained model 233 has been trained to learn a relationship between first information and second information. The first information indicates a positional relationship between a musical instrument and a second player using the musical instrument. The second information indicates a comment on the positional relationship indicated by the first information. The first information is an example of training-feature information. The second information is an example of training-comment information. The trained model 233 is an example of a first trained model.

The trained model 233 uses, as the first information, information indicative of imagery representative of how to use fingers of the second player in relation to the keys of the piano while the second player is playing the musical piece N on the piano. The first information (the information indicative of the imagery representative of how to use fingers of the second player in relation to the keys of the piano while the second player is playing the musical piece N on the piano) is an example of information indicative of how to use the second player's body in relation to the musical instrument. When the finger image information d1 indicates imagery representative of movements of fingers of the user 100B in relation to the keys of the piano, the first information (information indicative of the imagery representative of how to use fingers of the second player in relation to the keys of the piano while the second player is playing the musical piece N on the piano) is information indicative of imagery representative of movements of fingers of the second player in relation to the keys of the piano while the second player is playing the musical piece N on the piano. When the finger image information d1 indicates imagery representative of movements of bones of fingers of the user 100B in relation to the keys of the piano, the first information is information indicative of imagery representative of movements of bones of fingers of the second player in relation to the keys of the piano while the second player is playing the musical piece N on the piano.

The trained model 233 uses, as the second information, a combination of first image information and first sound information. The first image information indicates imagery in which a first model and an appropriate comment of a piano teacher about the imagery indicated by the first information are represented. The first model is a model of how to use fingers of the second player in relation to the keys of the piano while the second player is playing the musical piece N on the piano. The first sound information indicates sounds representative of the appropriate comment of the piano teacher about the imagery indicated by the first information. The appropriate comment of the piano teacher includes, for example, a comment "Release key quickly," a comment "Attention to chord error," or a comment "Stretch your fingers a little more." The appropriate comment of the piano teacher is not limited to the comments described above and may be changed as appropriate.

The multiple variables K1, which are used to realize the trained model 233, are defined by machine learning using multiple pieces of training data T1. The training data T1 includes a combination of training input data and training output data. The training data T1 includes the first information as the training input data. The training data T1 includes the second information as the training output data. The trained model 233 generates the output Y1 in accordance with the input X1. The trained model 233 uses, as the input X1, "information (for example, finger image information d1) indicative of the positional relationship between the musical instrument (musical instrument 100A) and the first player (user 100B). The trained model 233 uses, as the output Y1, "information indicative of a comment."

The multiple pieces of training data T1 may include only the training input data (first information), and need not include the training output data (second information). In this case, the multiple variables K1 are defined by machine learning such that the multiple pieces of training data T1 are divided into multiple clusters based on a degree of similarity between the multiple pieces of training data T1. Then, for each of the clusters, one or more persons set an association in the trained model 233. The association is an association between the cluster and the second information appropriate for the cluster. The trained model 233 identifies a cluster corresponding to the input X1, and then the trained model 233 generates the second information corresponding to the identified cluster, as the output Y1.

The transmitter 234 transmits the comment information b from the communication device 210 to the play learning system 100. The play learning system 100 is an example of a recipient.

A4: Operation of Play Learning System 100

Figure 4:
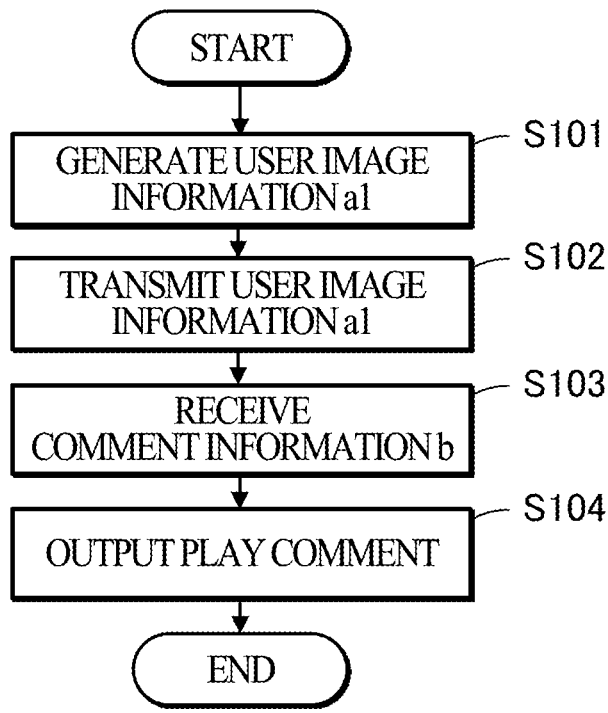
FIG. 4 is a diagram showing an operation of the play learning system 100.

FIG. 4 is a diagram showing an operation of the play learning system 100. In the following, it is assumed that the user 100B plays the musical piece N on the piano that is the musical instrument 100A.

The user 100B operates the operating device 150 to activate the play learning system 100. Then, the user 100B starts playing the musical piece N on the musical instrument 100A (piano). In response to the activation of the play learning system 100, the camera 110 generates the user image information a1 at step S101.

At step S102, the transmission controller 181 transmits the user image information a1 from the communication device 160 to the information processing apparatus 200.

At step S103, the communication device 160 receives the comment information b corresponding to the user image information a1 from the information processing apparatus 200.

At step S104, the output controller 182 outputs the play comment, which is indicated by the comment information b, from each of the display 130 and the loudspeaker 140.

A5: Operation of Information Processing Apparatus 200

Figure 5:
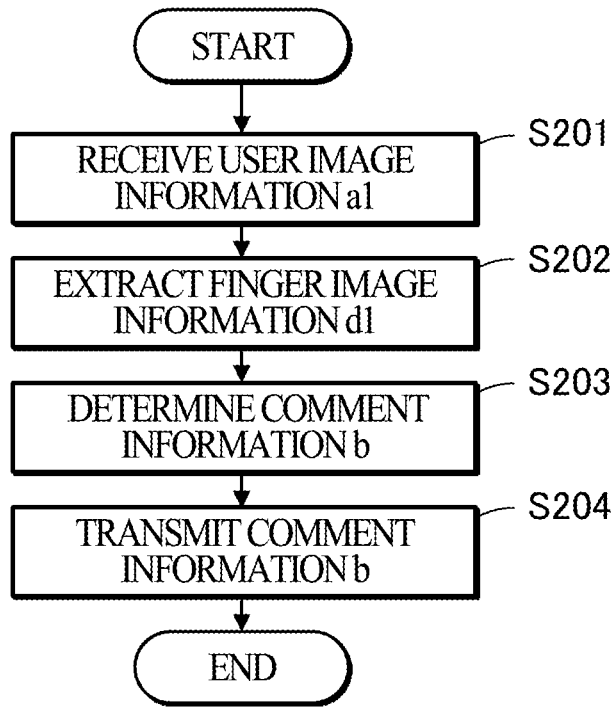
FIG. 5 is a diagram showing an operation of the information processing apparatus 200.

FIG. 5 is a diagram showing an operation of the information processing apparatus 200.

At step S201, the communication device 210 receives the user image information a1 from the play learning system 100 and then the extractor 231 receives the user image information a1 from the communication device 210.

At step S202, the extractor 231 extracts the finger image information d1 from the user image information a1. For example, when the user image information a1 indicates a musical score in addition to fingers of the user 100B and to the musical instrument 100A, at step S202, the extractor 231 extracts, as the finger image information d1, part of the user image information a1 not including the information indicative of the musical score.

At step S203, the determiner 232 determines the comment information b based on the finger image information d1. At step S203, the determiner 232 first inputs the finger image information d1 into the trained model 233. The determiner 232 determines, as the comment information b, information output from the trained model 233 in response to the input of the finger image information d1. The trained model 233 has been trained to learn the training data T1 indicative of an appropriate comment of a piano teacher. Accordingly, the comment information b tends to indicate an appropriate comment for the user 100B during playing of the musical instrument 100A.

At step S204, the transmitter 234 transmits the comment information b from the communication device 210 to the play learning system 100.

According to this embodiment, the comment information b is determined based on the finger image information d1 extracted from the user image information a1. Therefore, it is possible to identify appropriate comment information b compared to a configuration in which the comment information b is determined based on information output from the trained model 233 in response to the user image information a1, which includes information unnecessary for determining the comment information b, input into the trained model 233. Note that determining the comment information b based on the finger image information d1 extracted from the user image information a1 is included in determining the comment information b based on the user image information a1. Accordingly, this embodiment includes a configuration in which the determiner 232 determines the comment information b based on the user image information a1. Since the user image information a1 includes the finger image information d1, the determiner 232 may use the user image information a1 instead of the finger image information d1. For example, the determiner 232 first inputs the user image information a1 into the trained model 233. Then, the determiner 232 determines, as the comment information b, information output from the trained model 233 in response to the user image information a1. In this case, the extractor 231 can be omitted, and the determiner 232 determines the comment information b based on the user image information a1. The configuration, in which the user image information a1 is used instead of the finger image information d1 to determine the comment information b, is applicable to the following modifications as long as no conflict arises.

B: Modifications

The following are examples of modifications of the embodiment described above. Two or more modifications freely selected from the following modifications may be combined as long as no conflict arises from such a combination.

B1: First Modification

In the embodiment described above, the extractor 231 may be realized by the processor 180 in the play learning system 100, not realized by the information processing apparatus 200. In this case, the play learning system 100 transmits the finger image information d1, instead of the user image information a1, to the information processing apparatus 200. The determiner 232 in the information processing apparatus 200 determines the comment information b based on the finger image information d1 received from the play learning system 100. According to the first modification, it is possible to reduce a processing load of the information processing apparatus 200.

B2: Second Modification

In the embodiment and the first modification described above, the first information of the training data T1 (training input data) may be information indicative of imagery representative of how to use fingers of the second player in relation to the keys of the piano while the second player is playing the entire musical piece N on the piano. For example, when the finger image information d1 indicates the imagery representative of movements of fingers of the user 100B in relation to the keys of the piano (musical instrument 100A), the first information (the information indicative of the imagery representative of how to use fingers of the second player in relation to keys of the piano while the second player is playing the entire musical piece N on the piano) is information indicative of imagery representative of movements of fingers of the second player in relation to keys of the piano while the second player is playing the entire musical piece N on the piano. When the finger image information d1 indicates the imagery representative of movements of bones of fingers of the user 100B in relation to the keys of the piano (musical instrument 100A), the first information (the information indicative of the imagery representative of how to use fingers of the second player in relation to keys of the piano while the second player is playing the entire musical piece N on the piano) is information indicative of imagery representative of movements of bones of fingers of the second player in relation to keys of the piano while the second player is playing the entire musical piece N on the piano. The first information may be information indicative of imagery representative of how to use fingers of the second player in relation to keys of the piano while the second player is playing a portion of the musical piece N on the piano. When the finger image information d1 indicates the imagery representative of movements of fingers of the user 100B in relation to keys of the piano (musical instrument 100A), the first information (the information indicative of the imagery representative of how to use fingers of the second player in relation to keys of the piano while the second player is playing the portion of the musical piece N on the piano) is information indicative of imagery representative of movements of fingers of the second player in relation to keys of the piano while the second player is playing the portion of the musical piece N on the piano. When the finger image information d1 indicates the imagery representative of movements of bones of fingers of the user 100B in relation to keys of the piano (musical instrument 100A), the first information (the information indicative of the imagery representative of how to use fingers of the second player in relation to keys of the piano while the second player is playing the portion of the musical piece N on the piano) is information indicative of imagery representative of movements of bones of fingers of the second player in relation to keys of the piano while the second player is playing the portion of the musical piece N on the piano. The portion of the musical piece N may be obtained by dividing the musical piece N by each four measures. The portion of the musical piece N is not limited to a division of four measures, and may be obtained as appropriate.

The trained model 233 may be provided for a portion of the musical piece N. For example, the processor 230 realizes the trained model 233 for the portion of the musical piece N. In this case, it is possible to determine, for the portion of the musical piece N, comment information on the user 100B playing the piano. When different musical pieces are used, the trained model 233 may be provided for each of the different musical pieces. For example, the processor 230 realizes the trained model 233 for each of the different musical pieces. In this case, it is possible to determine comment information for each of the different musical pieces. According to the second modification, it is possible to change a portion of a musical piece that is a target for a comment. In addition, according to the second modification, it is possible to change a musical piece that is a target for a comment.

B3: Third Modification

In the embodiment and the first to second modifications described above, the feature information, which indicates the positional relationship between the musical instrument (musical instrument 100A) and the first player (user 100B), is not limited to the finger image information d1. Furthermore, the feature information, which indicates how to use the first player's body (the body of the user 100B) in relation to the musical instrument (musical instrument 100A), is not limited to the finger image information d1.

For example, the feature information may be feet image information indicative of imagery representative of how to use the feet of the first player (user 100B) in relation to piano pedals (pedals of the piano that is the musical instrument 100A). The feet image information is, for example, information indicative of imagery representative of movements of the feet of the first player (user 100B) in relation to the piano pedals. The feet image information may be information indicative of imagery representative of movements of bones of the feet of the first player (user 100B) in relation to the piano pedals. In this case, the user image information a1 indicates imagery in which the musical instrument 100A (piano) and the feet of the user 100B during playing of the musical piece N on the musical instrument 100A (piano) are represented. For example, a capture range of the camera 110 is set to a range that covers the musical instrument 100A (piano) and the feet of the user 100B playing the musical instrument 100A (piano). The camera 110 generates the user image information a1 by capturing the musical instrument 100A (piano) and the feet of the user 100B playing the musical instrument 100A. A method for extracting the feet image information from the user image information a1 is realized by using "the feet of a person during operating of piano pedals" instead of "fingers of a person during playing of keys of a piano" in the method for extracting the finger image information d1 from the user image information a1. In this case, the imagery indicated by the first information of the training data T1 represents how to use the feet of the second player in relation to piano pedals. When the feet image information is the information indicative of the imagery representative of movements of the feet of the first player (user 100B) in relation to the piano pedals (musical instrument 100A), the imagery indicated by the first information of the training data T1 represents movements of the feet of the second player in relation to the piano pedals. When the feet image information is the information indicative of the imagery representative of movements of bones of the feet of the first player (user 100B) in relation to the piano pedals (musical instrument 100A), the imagery indicated by the first information of the training data T1 represents movements of bones of the feet of the second player in relation to the piano pedals. The appropriate comment of the piano teacher indicated by the second information of the training data T1 includes, for example, a comment "Depress the damper pedal," a comment "Relax your toes," or a comment "Flex your toes." The appropriate comment of the piano teacher is not limited to the comments described above and may be changed as appropriate.

The feature information may be whole-body image information indicative of imagery representative of how to use the whole body of the first player (user 100B) in relation to the piano (musical instrument 100A). The whole-body image information is, for example, information indicative of imagery representative of movements of the whole body of the first player (user 100B) in relation to the piano (musical instrument 100A). The whole-body image information may be information indicative of imagery representative of movements of bones of the whole body of the first player (user 100B) in relation to the piano (musical instrument 100A). In this case, the user image information a1 indicates imagery in which the musical instrument 100A (piano) and the whole body of the user 100B during playing of the musical piece N on the musical instrument 100A (piano) are represented. For example, the camera 110 generates the user image information a1 by capturing the musical instrument 100A (piano) and the whole body of the user 100B playing the musical instrument 100A (piano). A method for extracting the whole-body image information from the user image information a1 is realized by using "a whole body of a person during playing of a piano" instead of "fingers of a person during playing of keys of a piano" in the method for extracting the finger image information d1 from the user image information a1. In this case, the imagery indicated by the first information of the training data T1 represents how to use the whole body of the second player in relation to a piano. When the whole-body image information is the information indicative of the imagery representative of movements of the whole body of the first player (user 100B) in relation to the piano (musical instrument 100A), the imagery indicated by the first information of the training data T1 represents movements of the whole body of the second player in relation to the piano. When the whole-body image information is the information indicative of the imagery representative of movements of bones of the whole body of the first player (user 100B) in relation to the piano (musical instrument 100A), the imagery indicated by the first information of the training data T1 represents movements of bones of the whole body of the second player in relation to the piano. The appropriate comment of the piano teacher indicated by the second information of the training data T1 is, for example, a comment "Keep your back straight" or a comment "Your arms are too close to your body." The appropriate comment of the piano teacher is not limited to the comments described above and may be changed as appropriate.

According to the third modification, it is possible to determine various comment information based on various positional relationships between the musical instrument (musical instrument 100A) and the first player (user 100B).

B4: Fourth Modification

In the embodiment and the first to third modifications described above, the determiner 232 may determine the comment information b without using the trained model 233. For example, the determiner 232 determines the comment information b using a comment table. The comment table indicates associations between movements of fingers and comment candidate information. An example will be described in which the comment table indicates an association between movements of fingers in which "a speed of movements of fingers is greater than or equal to a reference speed" and comment candidate information indicative of a comment candidate "Release key quickly." The determiner 232 calculates a speed of movements of fingers of the user 100B based on the finger image information d1 (or user image information a1). When the calculated speed is greater than or equal to the reference speed, the determiner 232 refers to the comment table to determine, as the comment information b, the comment candidate information indicative of the comment "Release key quickly" associated with movements of fingers in which "a speed of movements of fingers is greater than or equal to a reference speed." An example of movements of fingers and an example of the comment candidate information may be changed as appropriate. For example, the comment table may indicate an association between movements of fingers, specifically, a "correct direction of movements of fingers," and comment candidate information indicative of "good." In this case, the determiner 232 specifies a direction of movements of fingers of the user 100B based on the finger image information d1 (or user image information a1). When the specified direction of movements of fingers corresponds to the "correct direction of movements of fingers" indicated in the comment table, the determiner 232 determines, as the comment information b, the comment candidate information indicative of "good" associated with movements of fingers, specifically, the "correct direction of movements of fingers."

According to the fourth modification, it is possible to determine the comment information b without using the trained model 233.

B5: Fifth Modification

In the embodiment and the first to fourth modifications described above, the musical instrument 100A (the type of musical instrument 100A) may be changed. For example, the musical instrument 100A (the type of musical instrument 100A) is changed from a piano to a violin. When the musical instrument 100A (the type of musical instrument 100A) is changed, a corresponding trained model 233 may be provided for each type of musical instrument 100A (for each musical instrument). For example, the processor 230 realizes, for each type of musical instrument, a trained model 233 for the musical piece N. In the following, an example will be described in which the musical instrument 100A (the type of musical instrument 100A) is changed from a piano to a violin, or alternatively, the musical instrument 100A (the type of musical instrument 100A) is changed from a violin to a piano. A piano and a violin are each an example of a musical instrument. A piano and a violin are included in examples of musical instruments. The type of musical instrument 100A is not limited to a piano or a violin and may be changed as appropriate. The musical instruments are not limited to a piano and a violin and may be changed as appropriate.

Figure 6:
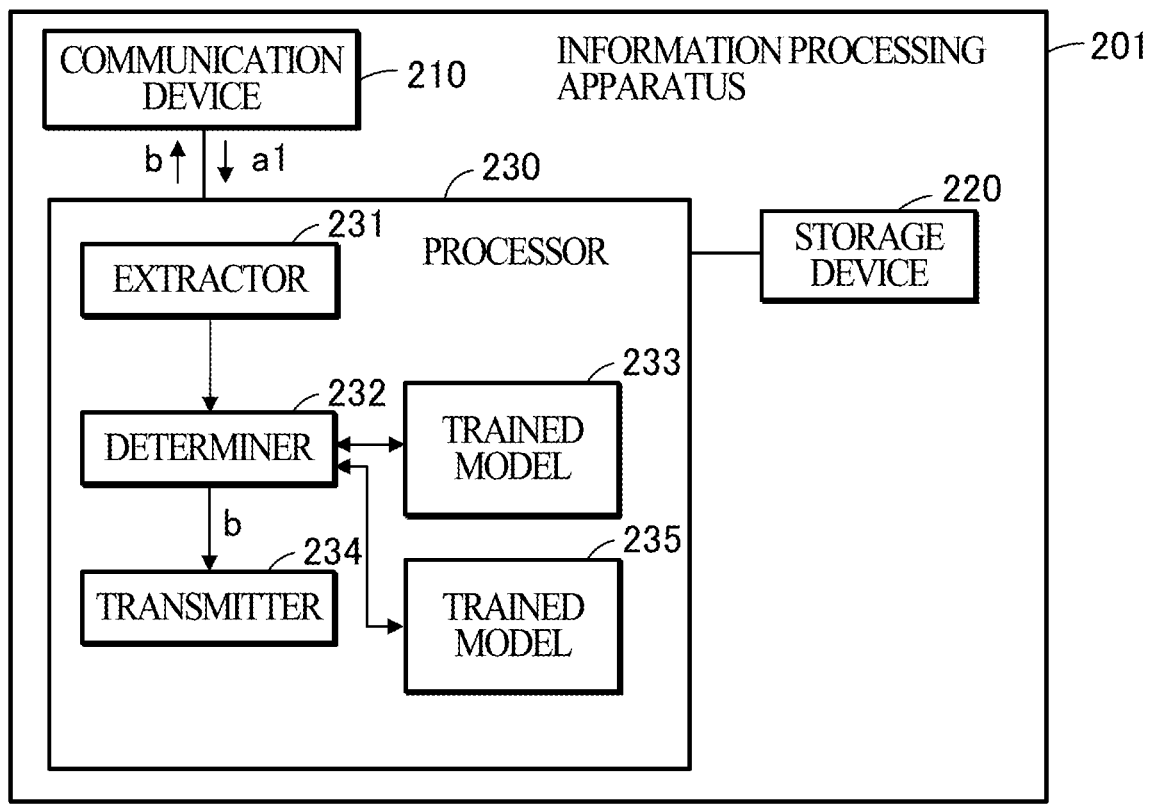
FIG. 6 is a diagram showing an example of an information processing apparatus 201.

FIG. 6 is a diagram showing an information processing apparatus 201 according to the fifth modification. The information processing apparatus 201 includes a trained model 235 in addition to the trained model 233. The trained model 233 is the trained model for a piano as described above. The trained model 235 is a trained model for a violin. In other words, the trained model 235 is an example of a trained model 233 corresponding to a violin. The trained model 233 and the trained model 235 are included in examples of a plurality of first-trained models for respective musical instruments. A trained model that includes the plurality of first-trained models for the respective musical instruments is another example of the first trained model. The first-trained models for the respective musical instruments are trained models that have a one-to-one correspondence with the musical instruments.

The trained model 235 includes a neural network. For example, the trained model 235 includes a deep neural network. The trained model 235 may include a convolutional neural network, for example. The trained model 235 may include a combination of multiple types of neural networks. The trained model 235 may include additional elements such as a self-attention mechanism. The trained model 235 may include a hidden Markov model or a support vector machine, and not include a neural network.

The trained model 235 has been trained to learn a relationship between first information, which indicates a positional relationship between a musical instrument (violin) and a second player using the musical instrument (violin), and second information, which indicates a comment on the positional relationship indicated by the first information. The trained model 235 is yet another example of the first trained model.

The trained model 235 uses, as the first information, information indicative of imagery representative of how to use fingers of the left hand of the second player in relation to the violin while the second player is playing the musical piece N on the violin. The first information (the information indicative of the imagery representative of how to use fingers of the left hand of the second player in relation to the violin while the second player is playing the musical piece N on the violin) is an example of the information indicative of how to use the second player's body in relation to a musical instrument. The information indicative of the imagery representative of how to use fingers of the left hand of the second player in relation to the violin while the second player is playing the musical piece N on the violin is, for example, information indicative of imagery representative of finger movements of the left hand of the second player in relation to the violin strings while the second player is playing the musical piece N on the violin. Alternatively, the information indicative of the imagery representative of how to use fingers of the left hand of the second player in relation to the violin while the second player is playing the musical piece N on the violin may be, for example, information indicative of imagery representative of movements of bones of fingers of the left hand of the second player in relation to the violin strings while the second player is playing the musical piece N on the violin.

The trained model 235 uses, as the second information, a combination of second image information and second sound information. The second image information indicates imagery in which a second model and an appropriate comment of a violin teacher about the imagery indicated by the first information used by the trained model 235 are represented. The second model is a model of how to use fingers of the left hand of the second player in relation to the violin while the second player is playing the musical piece N on the violin. The second sound information indicates sounds representative of the appropriate comment of the violin teacher about the imagery indicated by the first information used by the trained model 235. The appropriate comment of the violin teacher includes, for example, a comment "Let's spread out your fingers." The appropriate comment of the violin teacher is not limited to the comment described above and may be changed as appropriate.

The processor 230 functions as the trained model 235 based on a combination of an arithmetic program, which defines an operation for identifying output Y1 from input X1, and multiple variables K2. The multiple variables K2 are defined by machine learning using multiple pieces of training data T2. The training data T2 includes a combination of the first information used by the trained model 235 (training input data) and the second information used by the trained model 235 (training output data). The multiple pieces of training data T2 may include only the training input data (first information), and need not include the training output data (second information). In this case, the multiple variables K2 are defined by machine learning such that the multiple pieces of training data T2 are divided into multiple clusters based on a degree of similarity between the multiple pieces of training data T2. Then, for each of the clusters, one or more persons set an association in the trained model 235. The association is an association between the cluster and the second information appropriate for the cluster. The trained model 235 identifies a cluster corresponding to the input X1, and then the trained model 235 generates the second information corresponding to the identified cluster, as the output Y1.

In the fifth modification, the user 100B operates the operating device 150 to input musical instrument information c1, which indicates the type of musical instrument 100A (piano or violin), into the play learning system 100. The musical instrument information c1 is an example of musical instrument information indicative of a musical instrument among the musical instruments. The transmission controller 181 of the play learning system 100 transmits the musical instrument information c1 from the communication device 160 to the information processing apparatus 201.

The determiner 232 of the information processing apparatus 201 acquires the musical instrument information c1 to identify a trained model corresponding to the type (musical instrument) indicated by the musical instrument information c1 from among the trained models 233 and 235. For example, when the musical instrument information c1 indicates a piano, the determiner 232 identifies the trained model 233 as the trained model corresponding to the type (musical instrument) indicated by the musical instrument information c1. On the other hand, when the musical instrument information c1 indicates a violin, the determiner 232 identifies the trained model 235 as the trained model corresponding to the type (musical instrument) indicated by the musical instrument information c1.

After the user 100B inputs the musical instrument information c1 indicative of a piano as the type of musical instrument 100A, the user B sets the capture range of the camera 110 to a first range that covers the musical instrument 100A and the fingers of the user 100B during playing of the musical piece N on the musical instrument 100A (piano).

After the user 100B inputs the musical instrument information c1 indicative of a violin as the type of musical instrument 100A, the user B sets the capture range of the camera 110 to a second range that covers the musical instrument 100A and the fingers of the user 100B during playing of the musical piece N on the musical instrument 100A (violin).

The user 100B may set the first range or the second range before inputting the musical instrument information c1.

In the first range or in the second range, there may be an object (for example, a musical score) that is different from either the musical instrument 100A or the fingers of the user 100B.

The transmission controller 181 transmits the user image information a1, which is generated by the camera 110, from the communication device 160 to the information processing apparatus 201.

When the musical instrument information c1 indicates a piano, the extractor 231 of the information processing apparatus 201 operates as described in the first embodiment.

When the musical instrument information c1 indicates a violin, the extractor 231 extracts finger image information d2 from the user image information a1. The finger image information d2 indicates imagery representative of how to use fingers of the left hand of the user 100B in relation to the violin strings of the violin (musical instrument 100A). The finger image information d2 is an example of the feature information indicative of how to use the first player's body (the body of the user 100B) in relation to the musical instrument (musical instrument 100A). A method for extracting the finger image information d2 from the user image information a1 is realized by using "fingers of the left hand of a person during operating of violin strings" instead of "fingers of a person during playing of keys of a piano" in the method for extracting the finger image information d1 from the user image information a1.

When the trained model 235 uses, as the first information, the information indicative of the imagery representative of finger movements of the left hand of the second player in relation to the violin while the second player is playing the musical piece N on the violin, the finger image information d2 indicates imagery representative of finger movements of the left hand of the user 100B in relation to the violin strings of the violin (musical instrument 100A). When the trained model 235 uses, as the first information, the information indicative of the imagery representative of movements of bones of fingers of the left hand of the second player in relation to the violin while the second player is playing the musical piece N on the violin, the finger image information d2 indicates imagery representative of movements of bones of fingers of the left hand of the user 100B in relation to the violin strings of the violin (musical instrument 100A). The determiner 232 inputs the finger image information d2 into the trained model 235. Then, the determiner 232 determines, as the comment information b, information output from the trained model 235 in response to the input of the finger image information d2.

According to the fifth modification, it is possible for the determiner 232 to determine appropriate comment information b in accordance with the type of musical instrument 100A.

In the fifth modification, the first information of the training data T2 (training input data) may be information indicative of imagery representative of how to use fingers of the left hand of the second player in relation to the violin while the second player is playing the entire musical piece N on the violin. The first information may be information indicative of imagery representative of how to use fingers of the left hand of the second player in relation to the violin while the second player is playing a portion of the musical piece N (for example, a portion obtained by dividing out from the musical piece N a portion of four measures) on the violin. The trained model 235 may be provided for the portion of the musical piece N. For example, the processor 230 realizes the trained model 235 for the portion of the musical piece N. In this case, it is possible to determine, for the portion of the musical piece N, the comment information b on the user 100B playing the violin. When different musical pieces are used, the trained model 235 may be provided for each of the different musical pieces. For example, the processor 230 realizes the trained model 235 for each of the different musical pieces. In this case, it is possible to determine, for each of the musical pieces, the comment information b on the user 100B playing the violin.

In the fifth modification, the feature information, which indicates the positional relationship between the violin (musical instrument 100A) and the first player (user 100B), is not limited to the finger image information d2. In addition, the feature information, which indicates how to use the first player's body (the body of the user 100B) in relation to the violin (musical instrument 100A), is not limited to the finger image information d2. For example, the feature information may be upper body image information indicative of imagery representative of the posture of the upper body of the first player (user 100B) in relation to the violin (musical instrument 100A). The upper body image information is, for example, information indicative of imagery representative of movements of the upper body of the first player (user 100B) in relation to the violin (musical instrument 100A). The upper body image information may be information indicative of imagery representative of movements of bones of the upper body of the first player (user 100B) in relation to the violin (musical instrument 100A). In this case, the user image information a1 indicates imagery in which the musical instrument 100A (violin) and the upper body of the user 100B during playing of the musical piece N on the musical instrument 100A (violin) are represented. For example, the capture range of the camera 110 is set to a range that covers the musical instrument 100A (violin) and the upper body of the user 100B playing the musical instrument 100A (violin). The camera 110 generates the user image information a1 by capturing the musical instrument 100A (violin) and the upper body of the user 100B operating the musical instrument 100A (violin). A method for extracting the upper body image information from the user image information a1 is realized by using "the upper body of a person during playing of a violin" instead of "fingers of a person during playing of keys of a piano" in the method for extracting the finger image information d1 from the user image information a1. In this case, the imagery indicated by the first information of the training data T2 represents how to use the upper body of the second player in relation to a violin. When the upper body image information is the information indicative of the imagery representative of movements of the upper body of the first player (user 100B) in relation to the violin (musical instrument 100A), the imagery indicated by the first information of the training data T2 represents movements of the upper body of the second player in relation to the violin. When the upper body image information is the information indicative of the imagery representative of movements of bones of the upper body of the first player (user 100B) in relation to the violin (musical instrument 100A), the imagery indicated by the first information of the training data T2 represents movements of bones of the upper body of the second player in relation to the violin. The appropriate comment of the violin teacher indicated by the second information of the training data T2 includes, for example, a comment "You have a good posture. Keep it up," a comment "Increase the angle of the bow," or a comment "Let's use your middle and ring fingers as well as your index finger to press the bow." The appropriate comment of the violin teacher is not limited to the comments described above and may be changed as appropriate.

In the fifth modification, the types of musical instruments for the respective trained models are not limited to a piano and a violin, and may be changed as appropriate. For example, the type of musical instrument for the trained model 235 may be a guitar, a saxophone, or a flute, instead of a violin.

When the type of musical instrument for the trained model 235 is a guitar, the trained model 235 uses, as the first information, information indicative of imagery representative of how to use fingers of both hands of a second player in relation to a guitar while the second player is playing the musical piece N on the guitar. The first information (the information indicative of the imagery representative of how to use fingers of both hands of the second player in relation to the guitar while the second player is playing the musical piece N on the guitar) is an example of the information indicative of how to use the second player's body in relation to a musical instrument. The information indicative of the imagery representative of how to use fingers of both hands of the second player in relation to the guitar while the second player is playing the musical piece N on the guitar is, for example, information indicative of imagery representative of finger movements of both hands of the second player in relation to the guitar while the second player is playing the musical piece N on the guitar. Alternatively, the information indicative of the imagery representative of how to use fingers of both hands of the second player in relation to the guitar while the second player is playing the musical piece N on the guitar may be, for example, information indicative of imagery representative of movements of bones of fingers of both hands of the second player in relation to the guitar while the second player is playing the musical piece N on the guitar.

In this case, the trained model 235 uses, as the second information, a combination of third image information and third sound information. The third image information indicates imagery in which a third model and an appropriate comment of a guitar teacher about the imagery indicated by the first information used by the trained model 235 are represented. The third model is a model of how to use fingers of both hands of the second player in relation to the guitar while the second player is playing the musical piece N on the guitar. The third sound information indicates sounds representative of the appropriate comment of the guitar teacher about the imagery indicated by the first information used by the trained model 235. The appropriate comment of the guitar teacher includes, for example, a comment "The left hand tends to move slowly from a low position to a high position" or a comment "Good." The appropriate comment of the guitar teacher is not limited to the comments described above and may be changed as appropriate.

When a guitar is used as the musical instrument 100A, the capture range of the camera 110 is set to a range that covers the musical instrument 100A (guitar) and both hands of the user 100B. The user 100b inputs the musical instrument information c1, which indicates a guitar as the type of musical instrument 100A, from the operating device 150 into the play learning system 100. The musical instrument information c1 is transmitted to the information processing apparatus 200. When the musical instrument information c1 indicates a guitar, the extractor 231 of the information processing apparatus 201 extracts both-hands image information d3 from the user image information a1. The both-hands image information d3 indicates imagery representative of how to use fingers of both hands (right hand and left hand) of the user 100B in relation to the guitar (musical instrument 100A). The both-hands image information d3 is an example of the feature information indicative of how to use the first player's body (the body of the user 100B) in relation to the musical instrument (musical instrument 100A). A method for extracting the both-hands image information d3 from the user image information a1 is realized by using "fingers of both hands of a person during playing of a guitar" instead of "fingers of a person during playing of keys of a piano" in the method for extracting the finger image information d1 from the user image information a1. When the trained model 235 uses, as the first information, the information indicative of the imagery representative of finger movements of both hands of the second player in relation to the guitar while the second player is playing the musical piece N on the guitar, the both-hands image information d3 indicates imagery representative of finger movements of both hands of the user 100B in relation to the guitar (musical instrument 100A). When the trained model 235 uses, as the first information, the information indicative of the imagery representative of movements of bones of fingers of both hands of the second player in relation to the guitar while the second player is playing the musical piece N on the guitar, the both-hands image information d3 indicates imagery representative of movements of bones of fingers of both the hands of the user 100B in relation to the guitar (musical instrument 100A). The determiner 232 inputs the both-hands image information d3 into the trained model 235. Then, the determiner 232 determines, as the comment information b, information output from the trained model 235 in response to the input of the both-hands image information d3.

When the type of musical instrument for the trained model 235 is a saxophone, the trained model 235 uses, as the first information, information indicative of imagery representative of how to use mouth and cheek muscles of the second player in relation to a saxophone while the second player is playing the musical piece N on the saxophone. The first information (the information indicative of the imagery representative of how to use mouth and cheek muscles of the second player in relation to the saxophone while the second player is playing the musical piece N on the saxophone) is an example of the information indicative of how to use the second player's body in relation to a musical instrument. The information indicative of the imagery representative of how to use mouth and cheek muscles of the second player in relation to the saxophone while the second player is playing the musical piece N on the saxophone is, for example, information indicative of imagery representative of movements of mouth and cheek muscles of the second player in relation to the saxophone while the second player is playing the musical piece N on the saxophone. Alternatively, the information indicative of the imagery representative of how to use mouth and cheek muscles of the second player in relation to the saxophone while the second player is playing the musical piece N on the saxophone may be, for example, information indicative of imagery representative of movements of bones of the mouth and cheek of the second player in relation to the saxophone while the second player is playing the musical piece N on the saxophone.

In this case, the trained model 235 uses, as the second information, a combination of fourth image information and fourth sound information. The fourth image information indicates imagery in which a fourth model and an appropriate comment of a saxophone teacher about the imagery indicated by the first information used by the trained model 235 are represented. The fourth model is a model of how to use mouth and cheek muscles of the second player in relation to the saxophone while the second player is playing the musical piece N on the saxophone. The fourth sound information indicates sounds representative of the appropriate comment of the saxophone teacher about the imagery indicated by the first information used by the trained model 235. The appropriate comment of the saxophone teacher includes, for example, a comment "Tighten both sides of your mouth" or a comment "You are a little tense and let's relax a little and blow." The appropriate comment of the saxophone teacher is not limited to the comments described above and may be changed as appropriate.

When a saxophone is used as the musical instrument 100A, the capture range of the camera 110 is set to a range that covers the face of the user 100B and the musical instrument 100A (saxophone). The user 100*b* inputs the musical instrument information c1, which indicates a saxophone as the type of musical instrument 100A, from the operating device 150 into the play learning system 100. The musical instrument information c1 is transmitted to the information processing apparatus 200. When the musical instrument information c1 indicates a saxophone, the extractor 231 of the information processing apparatus 201 extracts face image information d4 from the user image information a1. The face image information d4 indicates imagery representative of how to use mouth and cheek muscles of the user 100B in relation to the saxophone (musical instrument 100A). The face image information d4 is an example of the feature information indicative of how to use the first player's body (the body of the user 100B) in relation to the musical instrument (musical instrument 100A). The method for extracting the face image information d4 from the user image information a1 is realized by using "mouth and cheek muscles of a person during playing of a saxophone" instead of "fingers of a person during playing of keys of a piano" in the method for extracting the finger image information d1 from the user image information a1. When the trained model 235 uses, as the first information, the information indicative of the imagery representative of movements of mouth and cheek muscles of the second player in relation to the saxophone while the second player is playing the musical piece N on the saxophone, the face image information d4 indicates imagery representative of movements of mouth and cheek muscles of the user 100B in relation to the saxophone (musical instrument 100A). When the trained model 235 uses, as the first information, the information indicative of the imagery representative of movements of bones of the mouth and the cheek of the second player in relation to the saxophone while the second player is playing the musical piece N on the saxophone, the face image information d4 indicates imagery representative of movements of bones of the mouth and the cheek of the user 100B in relation to the saxophone (musical instrument 100A). The determiner 232 inputs the face image information d4 into the trained model 235. Then, the determiner 232 determines, as the comment information b, information output from the trained model 235 in response to the input of the face image information d4.

When the type of musical instrument for the trained model 235 is a flute, the trained model 235 uses, as the first information, information indicative of imagery in which how to use cheek muscles of the second player in relation to a flute while the second player is playing the musical piece N on the flute and breath timing while the second player is playing the musical piece N on the flute are represented. The first information (the information indicative of the imagery in which how to use cheek muscles of the second player in relation to the flute while the second player is playing the musical piece N on the flute and breath timing while the second player is playing the musical piece N on the flute are represented) is an example of the information indicative of how to use the second player's body in relation to a musical instrument, and the first information is, for example, image information indicative of imagery in which a flute and the upper body of the second player playing the musical piece N on the flute are represented. The information indicative of the imagery in which how to use cheek muscles of the second player in relation to the flute while the second player is playing the musical piece N on the flute and breath timing while the second player is playing the musical piece N on the flute are represented is, for example, information indicative of imagery representative of movements of the upper body of the second player playing the musical piece N on the flute. Alternatively, the information indicative of the imagery in which how to use cheek muscles of the second player in relation to the flute while the second player is playing the musical piece N on the flute and breath timing while the second player is playing the musical piece N on the flute are represented may be, for example, information indicative of imagery representative of movements of bones of the upper body of the second player playing the musical piece N on the flute.

In this case, the trained model 235 uses, as the second information, a combination of fifth image information and fifth sound information. The fifth image information indicates imagery in which a fifth model and an appropriate comment of a flute teacher about the imagery indicated by the first information used by the trained model 235 are represented. The fifth model is a model of both how to use cheek muscles of the second player in relation to the flute while the second player is playing the musical piece N on the flute and breath timing while the second player is playing the musical piece N on the flute. The fifth sound information indicates sounds representative of the appropriate comment of the flute teacher about the imagery indicated by the first information used by the trained model 235. The appropriate comment of the flute teacher includes, for example, a comment "Image blowing out a candle, and try to blow with ease," or "Practice quick passages slowly, and then challenge yourself by increasing speed." The appropriate comment of the flute teacher is not limited to the comments described above and may be changed as appropriate.

When a flute is used as the musical instrument 100A, the capture range of the camera 110 is set to a range that covers the upper body of the user 100B and the musical instrument 100A (flute). The user 100b inputs the musical instrument information c1, which indicates a flute as the type of musical instrument 100A, from the operating device 150 into the play learning system 100. The musical instrument information c1 is transmitted to the information processing apparatus 200. When the musical instrument information c1 indicates a flute, the extractor 231 of the information processing apparatus 202 extracts upper body image information d5 from the user image information a1. The upper body image information d5 indicates imagery representative of how to use cheek muscles of the user 100B in relation to the flute (musical instrument 100A) and breath timing of the user 100B. The upper body image information d5 is an example of the feature information indicative of how to use the first player's body (the body of the user 100B) in relation to the musical instrument (musical instrument 100A). A method for extracting the upper body image information d5 from the user image information a1 is realized by using "an upper body of a person during playing of a flute" instead of "fingers of a person during playing of keys a piano" in the method for extracting the finger image information d1 from the user image information a1. When the trained model 235 uses, as the first information, the information indicative of the imagery representative of movements of the upper body of the second player in relation to the flute while the second player is playing the musical piece N on the flute, the upper body image information d5 indicates imagery representative of movements of the upper body of the user 100B in relation to the flute (musical instrument 100A). When the trained model 235 uses, as the first information, the information indicative of the imagery representative of movements of bones of the upper body of the second player in relation to the flute while the second player is playing the musical piece N on the flute, the upper body image information d5 indicates imagery representative of movements of bones of the upper body of the user 100B in relation to the flute (musical instrument 100A). The determiner 232 inputs the upper body image information d5 into the trained model 235. Then, the determiner 232 determines, as the comment information b, information output from the trained model 235 in response to the input of the upper body image information d5.

In the fifth modification, the number of trained models is not limited to two and may be three or more. Each of the three or more trained models corresponds to a different kind of musical instrument.

B6: Sixth Modification

In the fifth modification, the musical instrument information c1 may be identified based on the user image information a1.

Figure 7:
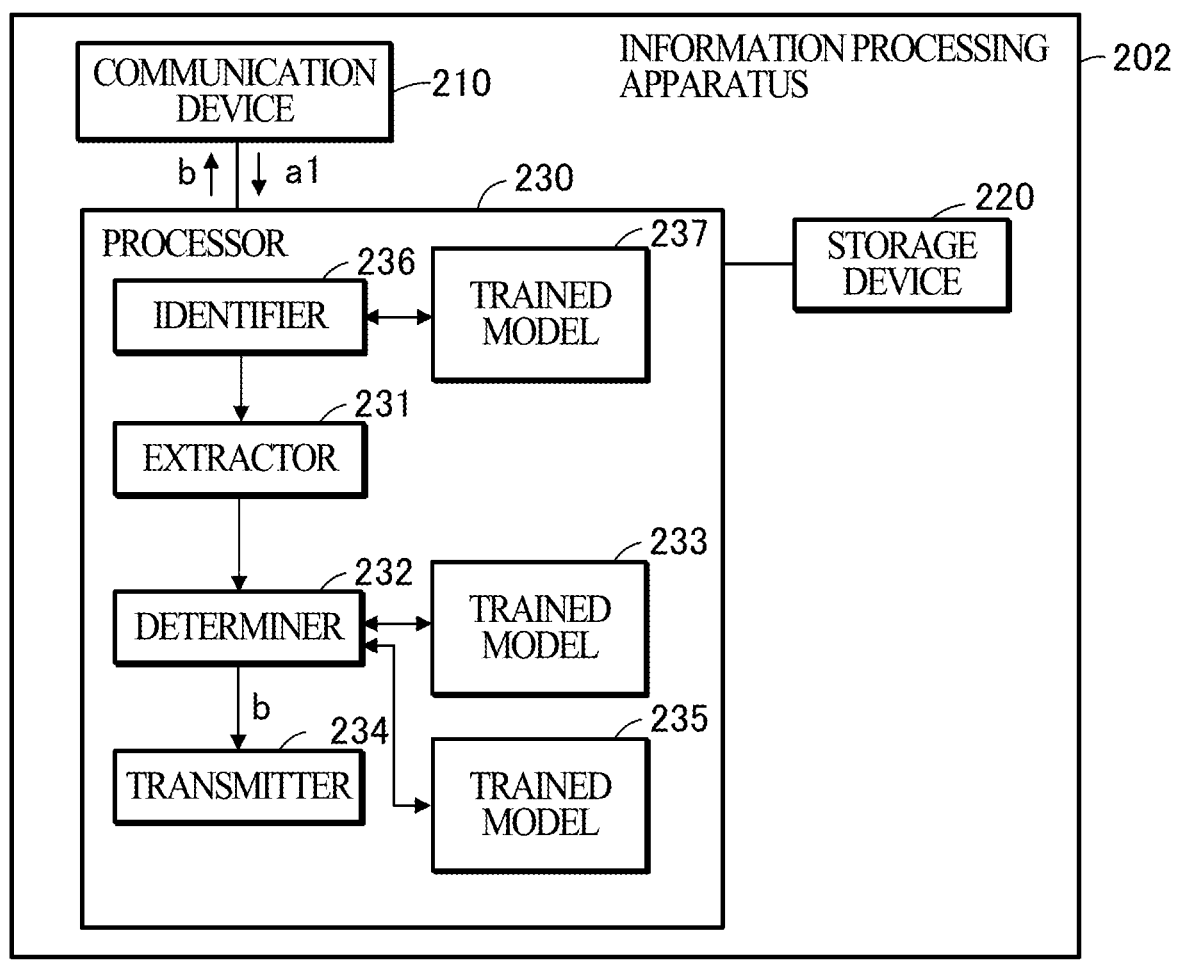
FIG. 7 is a diagram showing an example of an information processing apparatus 202.

FIG. 7 is a diagram showing an information processing apparatus 202. The information processing apparatus 202 includes an identifier 236 and a trained model 237. The identifier 236 is configured to identify the musical instrument information c1. The identifier 236 is realized by the processor 230 that executes a program. The identifier 236 identifies the musical instrument information c1 based on the imagery of the musical instrument 100A indicated by the user image information a1. The identifier 236 identifies the musical instrument information c1 using the trained model 237, for example. The user image information a1 is an example of first related information related to the type of musical instrument (musical instrument 100A). The first related information is an example of second related information related to the musical instrument (musical instrument 100A such as a piano, etc.). The second related information is an example of related information.

The trained model 237 includes a neural network. For example, the trained model 237 includes a deep neural network. The trained model 237 may include a convolutional neural network, for example. The trained model 237 may include a combination of multiple types of neural networks. The trained model 237 may include additional elements such as a self-attention mechanism. The trained model 237 may include a hidden Markov model or a support vector machine, and not include a neural network.

The trained model 237 has been trained to learn a relationship between third information and fourth information. The third information is information related to a type of musical instrument (musical instrument such as a piano, etc.). The fourth information is information indicative of the type of musical instrument (musical instrument such as a piano, etc.) related to the third information. The trained model 237 is an example of a second trained model. The trained model 237 uses, as the third information, information indicative of imagery of a musical instrument (musical instrument such as a piano, etc.).

The processor 230 functions as the trained model 237 based on a combination of an arithmetic program and multiple variables K3. The arithmetic program defines an operation for identifying output Y1 from input X1. The multiple variables K3 are stored in the storage device 220. The multiple variables K3 are defined by machine learning using multiple pieces of training data T3. The training data T3 includes a combination of information, which indicates imagery of the musical instrument 100A (training input data), and information, which indicates a type that includes the musical instrument represented by the imagery indicated by the training input data (training output data). The multiple pieces of training data T3 may include only the training input data (information indicative of the imagery of the musical instrument 100A) and need not include the training output data (information indicative of the type that includes the musical instrument represented by the imagery indicated by the training input data). In this case, the multiple variables K3 are defined by machine learning such that the multiple pieces of training data T3 are divided into multiple clusters based on a degree of similarity between the multiple pieces of training data T3. Then, for each of the clusters, one or more persons set an association in the trained model 237. The association is an association between the cluster and the fourth information (information indicative of the type of musical instrument appropriate for the cluster). The trained model 237 identifies a cluster corresponding to the input X1, and then the trained model 237 generates the fourth information corresponding to the identified cluster, as the output Y1.

The identifier 236 inputs the user image information a1 into the trained model 237. Then, the identifier 236 identifies, as the musical instrument information c1, information output from the trained model 237 in response to the input of the user image information a1.

According to the sixth modification, it is possible to identify the type of instrument 100A based on information indicative of the imagery of the musical instrument 100A. In addition, it is possible to use the user image information a1 as information for identifying the type of musical instrument 100A. The information indicative of the imagery of the musical instrument 100A is not limited to the user image information a1. For example, the information indicative of the imagery of the musical instrument 100A may be information indicative of imagery that represents the musical instrument 100A without representing the user 100B.

B7: Seventh Modification

In the sixth modification, the first related information related to the type of musical instrument 100A is not limited to the information indicative of the imagery of the musical instrument 100A. In addition, the second related information related to the musical instrument 100A is not limited to the information indicative of the imagery of the musical instrument 100A. The first related information and the second related information may be musical instrument sound information. The musical instrument sound information indicates sounds emitted from the musical instrument 100A in a state in which the user 100B plays the musical instrument 100A. The musical instrument sound information is an example of information indicative of sounds emitted from the musical instrument in a state in which the first player plays the musical instrument. In the following, it is assumed that the musical instrument sound information indicates sounds emitted from the musical instrument 100A in a state in which the user 100B plays the musical piece N on the musical instrument 100A.

Figure 8:
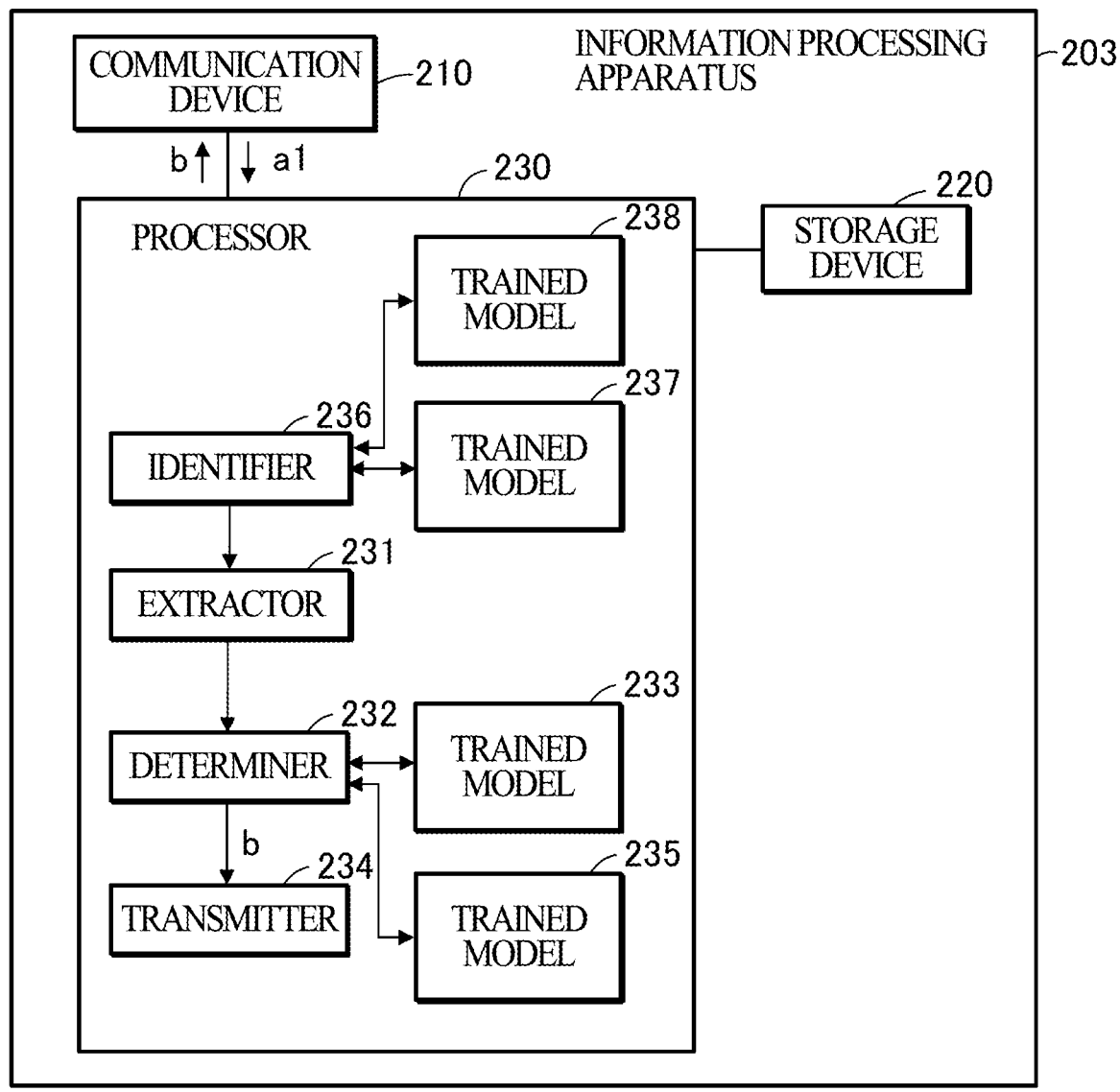
FIG. 8 is a diagram showing an example of an information processing apparatus 203.

FIG. 8 is a diagram showing an information processing apparatus 203 according to a seventh modification. The information processing apparatus 203 differs from the information processing apparatus 202 shown in FIG. 7 in that the information processing apparatus 203 includes a trained model 238.

When the play learning system 100 includes a microphone, the musical instrument sound information is generated by the microphone of the play learning system 100, for example. The musical instrument sound information is transmitted from the communication device 160 to the information processing apparatus 203. The identifier 236 of the information processing apparatus 203 identifies the musical instrument information c1 based on the musical instrument sound information. The identifier 236 identifies the musical instrument information c1 by using the trained model 238.

The trained model 238 includes a neural network. For example, the trained model 238 includes a deep neural network. The trained model 238 may include a convolutional neural network, for example. The trained model 238 may include a combination of multiple types of neural networks. The trained model 238 may include additional elements such as a self-attention mechanism. The trained model 238 may include a hidden Markov model or a support vector machine, and not include a neural network.

The trained model 238 has been trained to learn a relationship between the third information and the fourth information. The third information is information related to a type of musical instrument (musical instrument such as a piano, etc.). The fourth information is information indicative of the type of musical instrument (musical instrument such as a piano, etc.) and relates to the third information. The third information is an example of training-related information related to a musical instrument. The fourth information is an example of training-musical instrument information indicative of a musical instrument specified from the training-related information. The trained model 238 uses, as the third information, information indicative of sounds emitted from the musical instrument 100A. The trained model 238 is an example of the second trained model.

The processor 230 functions as the trained model 238 based on a combination of an arithmetic program, which defines an operation for identifying output Y1 from input X1, and multiple variables K4. The multiple variables K4 are stored in the storage device 220. The multiple variables K4 are defined by machine learning using multiple pieces of training data T4. The training data T4 includes a combination of information, which indicates sounds emitted from the musical instrument 100A (training input data), and information, which indicates a type that includes a musical instrument that emits the sounds indicated by the training input data (training output data). The multiple pieces of training data T4 may include only the training input data (information indicative of the sounds emitted from the musical instrument 100A) and need not include the training output data (information indicative of the type that includes the musical instrument that emits the sounds indicated by the training input data). In this case, the multiple variables K4 are defined by machine learning such that the multiple pieces of training data T4 are divided into multiple clusters based on a degree of similarity between the multiple pieces of training data T4. Then, for each of the clusters, one or more persons set an association in the trained model 238. The association is an association between the cluster and information indicative of the type of musical instrument appropriate for the cluster. The trained model 238 identifies a cluster corresponding to the input X1, and then the trained model 238 generates information indicative of the type of musical instrument corresponding to the identified cluster, as the output Y1.

The identifier 236 inputs the musical instrument sound information into the trained model 238. The identifier 236 identifies, as the musical instrument information c1, information output from the trained model 238 in response to the input of the musical instrument sound information. As long as the musical instrument sound information used by the identifier 236 is information indicative of sounds emitted from the musical instrument 100A, the musical instrument sound information used by the identifier 236 is not limited to the information indicative of the sounds emitted from the musical instrument 100A in a state in which the user 100B plays the musical instrument 100A.

According to the seventh modification, it is possible to identify the type of musical instrument 100A based on information indicative of sounds emitted from the musical instrument 100A.

In the seventh modification, the determiner 232 may determine the comment information b based on the finger image information d1 (feature information) and the musical instrument sound information. The musical instrument sound information indicates sounds emitted from the musical instrument 100A in a state in which the user 100B plays the musical instrument 100A.

For example, the determiner 232 may determine comment information b by using the trained model 233, the musical instrument sound information, and the finger image information d1. The trained model 233 has been trained based on the training data T1 described below.

The training input data of the training data T1 is a combination of information, which indicates sounds emitted from a piano in a state in which the second player plays the musical piece N on the piano, and information, which indicates imagery representative of how to use fingers of the second player in relation to the keys of the piano while the second player is playing the musical piece N on the piano.

The training output data of the training data T1 indicates an appropriate comment of a piano teacher on a combination of the sounds and the imagery indicated by the training input data.

The appropriate comment of the piano teacher includes, for example, a comment "Use of your fingers and sounds from the piano are good," a comment "Release key quickly," a comment "Attention to chord error," or a comment "Stretch your fingers a little more."

The determiner 232 first inputs the finger image information d1 and the musical instrument sound information, which indicates the sounds emitted from the musical instrument 100A in a state in which the user 100B plays the musical instrument 100A, into the trained model 233. The determiner 232 determines, as the comment information b, information output from the trained model 233 in response to the input of the finger image information d1 and the musical instrument sound information. In this case, the determiner 232 determines the comment information b based on the musical instrument sound information and the finger image information d1 (feature information). Accordingly, it is possible to determine the comment information b indicative of a more appropriate comment. The feature information is not limited to the finger image information d1 and may be changed as appropriate.

B8: Eighth Modification

In the sixth and seventh modifications, the first related information related to the type of musical instrument and the second related information related to the musical instrument may be musical-score information indicative of a musical score corresponding to a type of musical instrument (musical instrument 100A such as a piano, etc.). A musical score corresponding to a type of musical instrument is an example of a musical score corresponding to the musical instrument (musical instrument 100A such as a piano, etc.). A musical score may be referred to as a sheet of music. The musical-score information is generated by a camera configured to capture a musical score, for example. For example, the camera 110 is used as a device configured to generate the musical-score information. The musical-score information is transmitted from the play learning system 100 to the information processing apparatus 202 or 203.

The identifier 236 identifies the musical instrument information c1 based on the musical score indicated by the musical-score information. For example, the identifier 236 identifies the musical instrument information c1 based on the type of musical score.

When the musical score indicated by the musical-score information is tablature, the identifier 236 identifies the musical instrument information c1, which indicates a guitar as the type of musical instrument. In guitar tablature, strings are shown by six parallel lines, as shown in FIG. 9. Accordingly, when the musical score indicated by the musical-score information shows six parallel lines, the identifier 236 determines that the musical score, which is indicated by the musical-score information, is guitar tablature.

When the musical score indicated by the musical-score information is a guitar chord song chart, the identifier 236 identifies the musical instrument information c1, which indicates a guitar as the type of musical instrument. In a guitar chord song chart, named guitar chords are shown along with lyrics, as shown in FIG. 10. Accordingly, when the musical score indicated by the musical-score information shows named chords, the identifier 236 determines that the musical score, which is indicated by the musical-score information, is a guitar chord song chart.

When the musical score indicated by the musical-score information is a drum score, the identifier 236 identifies the musical instrument information c1, which indicates a drum kit as the type of musical instrument. In a drum score, symbols corresponding to drum types included in a drum kit are shown, as shown in FIG. 11. Accordingly, when the musical score indicated by the musical-score information shows symbols corresponding to drum types included in a drum kit, the identifier 236 determines that the musical score, which is indicated by the musical-score information, is a drum score.

When the musical score indicated by the musical-score information is a score for a duet, the identifier 236 identifies the musical instrument information c1, which indicates a piano as the type of musical instrument. As shown in FIG. 12, in a score for a duet, symbols 12a indicative of a duet are shown. Accordingly, when the musical score indicated by the musical-score information shows the symbols 12a indicative of a duet, the identifier 236 determines that the musical score, which is indicated by the musical-score information, is a score for a duet.

The identifier 236 may identify the musical instrument information c1 based on a positional relationship between musical notes on the musical score indicated by the musical-score information. As shown in FIG. 13, when the musical score indicated by the musical-score information shows a musical notation 13a indicative of simultaneous output of plural sounds, the identifier 236 determines that the musical score, which is indicated by the musical-score information, is a musical score for a keyboard instrument [for example, a piano or an electone (registered trademark)]. In this case, the identifier 236 identifies the musical instrument information c1, which indicates a piano or an electone as the type of musical instrument.

When the musical score indicated by the musical-score information shows a symbol that identifies a type of musical instrument (for example, a character string representative of the name of the musical instrument, or a sign relating to the type of musical instrument), the identifier 236 may identify, as the musical instrument information c1, information indicative of the type of musical instrument identified by the symbol. For example, when the storage device 220 stores a musical instrument table, which indicates associations between information indicative of the type of musical instrument and a sign relating to the type of musical instrument, the identifier 236 refers to the musical instrument table to identify, as the musical instrument information c1, information (information indicative of the type of musical instrument) associated with the sign shown on the musical score. In this case, the sign relating to the type of musical instrument is an example of related information. The musical instrument table is an example of a table indicative of associations between information related to the type of musical instrument and information indicative of the type of musical instrument. The information related to the type of musical instrument is an example of reference-related information related to a musical instrument. The information indicative of the type of musical instrument is an example of reference-musical instrument information indicative of the musical instrument.

The musical-score information is not limited to information generated by a camera configured to capture a musical score. The musical-score information may be a so-called electronic musical score. When an electronic musical score includes type data indicative of the type of musical instrument, the identifier 236 may identify the type data as the musical instrument information c1.

According to the eighth modification, it is possible to use the musical-score information as related information related to the type of musical instrument.

B9: Ninth Modification

In the sixth to eighth modifications, when schedule information, which indicates a schedule of the user 100B, also indicates the type of musical instrument, the schedule information may be used as the first related information related to the type of musical instrument. The schedule information may indicate a schedule of a room for students, in which the play learning system 100 is located, as long as the schedule information indicates a combination of the type of musical instrument and a lesson schedule for the type of musical instrument. The combination of the type of musical instrument (for example, a piano) and a lesson schedule for the type of musical instrument (for example, a piano) is an example of a combination of a musical instrument (for example, a piano) and a lesson schedule for the musical instrument (for example, a piano).

FIG. 14 is a diagram showing an example of the schedule indicated by the schedule information. In FIG. 14, for each time period for teaching (lesson), the type of musical instrument (a piano, a flute, or a violin), which is a lesson target, is indicated. The identifier 236 first refers to the schedule information to identify a time period of a lesson in which the current time is included. Then, the identifier 236 identifies the type of musical instrument that is a lesson target corresponding to the identified time period. Then, the identifier 236 identifies, as the musical instrument information c1, information indicative of the type of musical instrument that is the identified lesson target.

FIG. 15 is a diagram showing another example of the schedule indicated by the schedule information. In FIG. 15, for each lesson date, the type of musical instrument, which is a lesson target, is indicated. The identifier 236 first refers to the schedule information to identify the type of musical instrument that is a lesson target corresponding to the current date. Then, the identifier 236 identifies, as the musical instrument information c1, information indicative of the type of musical instrument that is the identified lesson target.

According to the ninth modification, it is possible to use the schedule information as the first related information related to the type of musical instrument.

B10: Tenth Modification

In the embodiment and the first to ninth modifications described above, the operating device 150, which is a touch panel, may include, as a user interface for receiving the musical instrument information c1, a user interface as shown in FIG. 16. A touch on a piano button 151 causes input of the musical instrument information c1 indicative of a piano as the type of musical instrument. A touch on a flute button 152 causes input of the musical instrument information c1 indicative of a flute as the type of musical instrument. The user interface, which receives the musical instrument information c1, is not limited to the user interface shown in FIG. 16. According to the tenth modification, a user can easily input the musical instrument information c1.

B11: Eleventh Modification

In the embodiment and the first to tenth modifications described above, the recipient of the comment information b is not limited to the play learning system 100. The recipient of the comment information b may be an electronic device used by a guardian of the user 100B (for example, a parent of the user 100B). The electronic device is, for example, a smartphone, a tablet, or a notebook personal computer. The recipient of the comment information b may include both the play learning system 100 and the electronic device used by the guardian of the user 100B.

According to the eleventh modification, a guardian of the user 100B can teach the user 100B by referring to the comment information.

B12: Twelfth Modification

The processor 180 of the play learning system 100 may further include the functions of the processor 230 of one of the information processing apparatuses 200 to 203. In this case, the play learning system 100 can obtain the comment information b without communicating with any of the information processing apparatuses 200 to 203.

B13: Thirteenth Modification

In the embodiment and the first to twelfth modifications described above, the processor 230 may generate the trained model 233.

Figure 17:
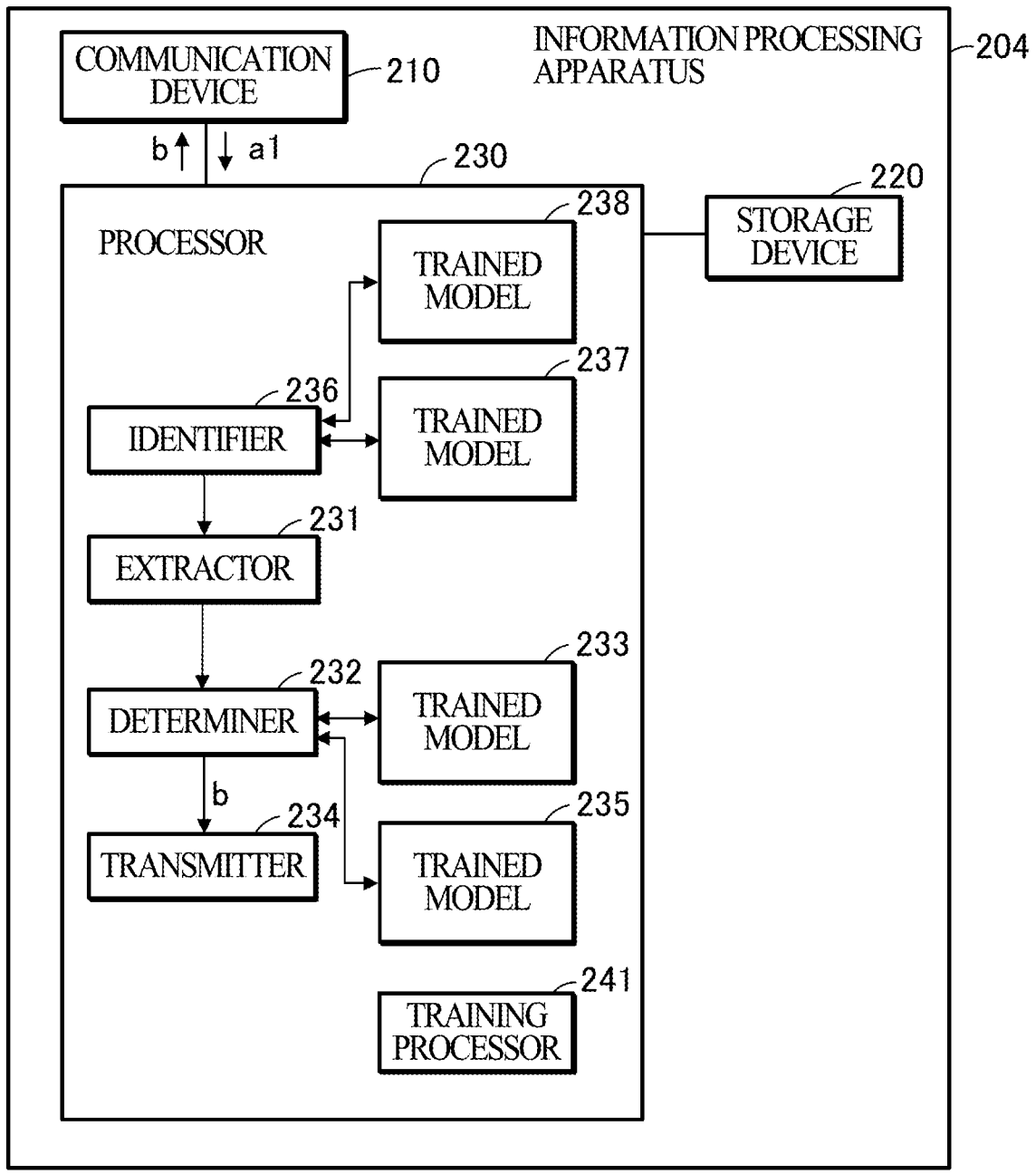
FIG. 17 is a diagram showing an example of an information processing apparatus 204.

FIG. 17 is a diagram showing an information processing apparatus 204 according to a thirteenth modification. The information processing apparatus 204 differs from the information processing apparatus 203 shown in FIG. 8 in that the information processing apparatus 204 includes a training processor 241. The training processor 241 is realized by the processor 230 that executes a machine learning program. The machine learning program is stored in the storage device 220.

Figure 18:
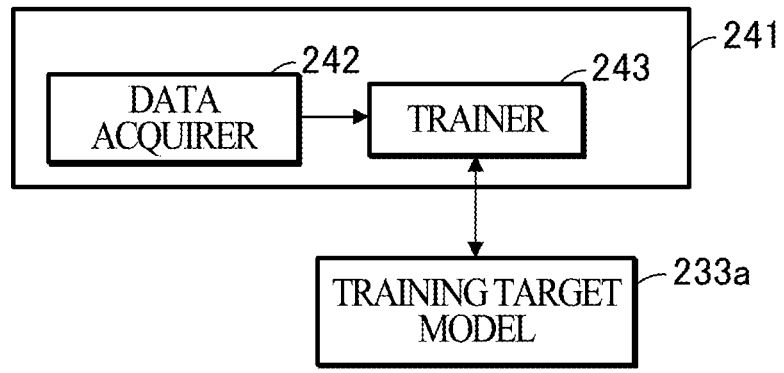
FIG. 18 is a diagram showing an example of a training processor 241.

FIG. 18 is a diagram showing an example of the training processor 241. The training processor 241 includes a data acquirer 242 and a trainer 243. The data acquirer 242 acquires the multiple pieces of training data T1. When the storage device 220 stores the multiple pieces of training data T1, the data acquirer 242 acquires the multiple pieces of training data T1 from the storage device 220.

The trainer 243 generates the trained model 233 by executing processing (hereinafter referred to as "training processing") using the multiple pieces of training data T1. The training processing is included in supervised machine learning using the multiple pieces of training data T1. The trainer 243 changes a training target model 233a into the trained model 233 by training the training target model 233a using the multiple pieces of training data T1.

The training target model 233a is generated by the processor 230 using temporary multiple variables K1 and the arithmetic program. The temporary multiple variables K1 are stored in the storage device 220. The training target model 233a differs from the trained model 233 in that the training target model 233a uses the temporary multiple variables K1. The training target model 233a generates information (output data) in accordance with input information (input data).

The trainer 243 specifies a value of a loss function L. The value of the loss function L indicates a difference between first output data and second output data. The first output data is generated by the training target model 233a in response to the input data in the training data T1 being input into the training target model 233a. The second output data is the output data in the training data T1. The trainer 243 updates the temporary multiple variables K1 such that the value of the loss function L is reduced. The trainer 243 executes processing to update the temporary multiple variables K1 for each of the multiple pieces of training data T1. Upon completion of the training by the trainer 243, the multiple variables K1 are fixed. The training target model 233a has been trained by the trainer 243. In other words, the trained model 233 outputs output data statistically appropriate for input data.

Figure 19:
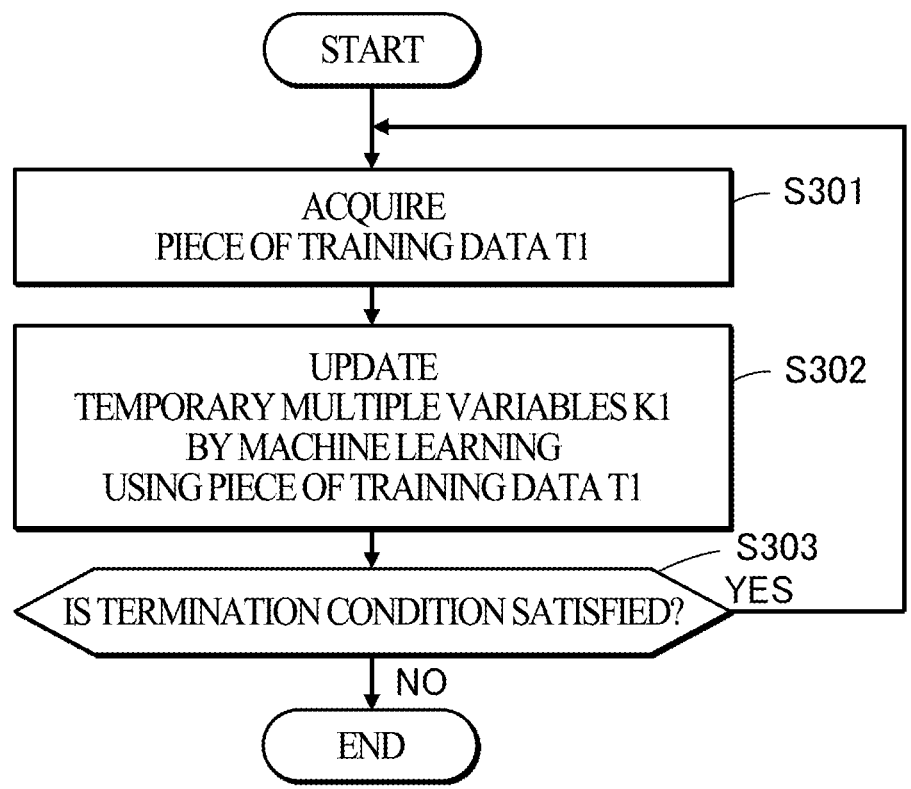
FIG. 19 is a diagram showing an example of training processing.

FIG. 19 is a diagram showing an example of the training processing. For example, the training processing starts in response to an instruction from a user.

At step S301, the data acquirer 242 acquires a piece of training data T1, which has not been acquired, from among the multiple pieces of training data T1. At step S302, the trainer 243 trains the training target model 233a using the piece of training data T1. At step S302, the trainer 243 updates the temporary multiple variables K1 such that the value of the loss function L specified by using the piece of training data T1 is reduced. For the processing to update the temporary multiple variables K1 in accordance with the value of the loss function L, for example, a backpropagation method is used.

At step S303, the trainer 243 determines whether a termination condition related to the training processing is satisfied. The termination condition is, for example, a condition, in which a value of the loss function L is less than a predetermined threshold, or a condition, in which an amount of change in the value of the loss function L is less than a predetermined threshold. When the termination condition is not satisfied, the processing returns to step S301. Accordingly, the acquisition of a piece of training data T1 and the updating of the temporary multiple variables K1 using the piece of training data T1 are repeated until the termination condition is satisfied. When the termination condition is satisfied, the training processing terminates.

The training processor 241 may be realized by a processor different from the processor 230. The processor different from the processor 230 includes at least one computer.

The data acquirer 242 may acquire multiple pieces of training data, which are different from the multiple pieces of training data T1. For example, the data acquirer 242 may acquire one or more types of multiple pieces of training data from among four types of multiple pieces of training data. The four types of multiple pieces of training data include multiple pieces of training data T2, T3, T4, and T5. The trainer 243 trains a training target model corresponding to the type of multiple pieces of training data acquired by the data acquirer 242. The training target model corresponding to the multiple pieces of training data T2 is a training target model generated by the processor 230 using temporary multiple variables K2 and the arithmetic program. The training target model corresponding to the multiple pieces of training data T3 is a training target model generated by the processor 230 using temporary multiple variables K3 and the arithmetic program. The training target model corresponding to the multiple pieces of training data T4 is a training target model generated by the processor 230 using temporary multiple variables K4 and the arithmetic program. The training target model corresponding to the multiple pieces of training data T5 is a training target model generated by the processor 230 using temporary multiple variables K5 and the arithmetic program.

The data acquirer 242 may be provided for each of the types of multiple pieces of training data. In this case, each data acquirer 242 acquires the corresponding multiple pieces of training data.

The trainer 243 may be provided for each of the types of multiple pieces of training data. In this case, each trainer 243 uses the corresponding multiple pieces of training data to train a training target model corresponding to the corresponding multiple pieces of training data.

According to the thirteenth modification, the training processor 241 can generate at least one trained model.

In the thirteenth modification, the data acquirer 242 may generate at least one of the multiple pieces of training data.

Figure 20:
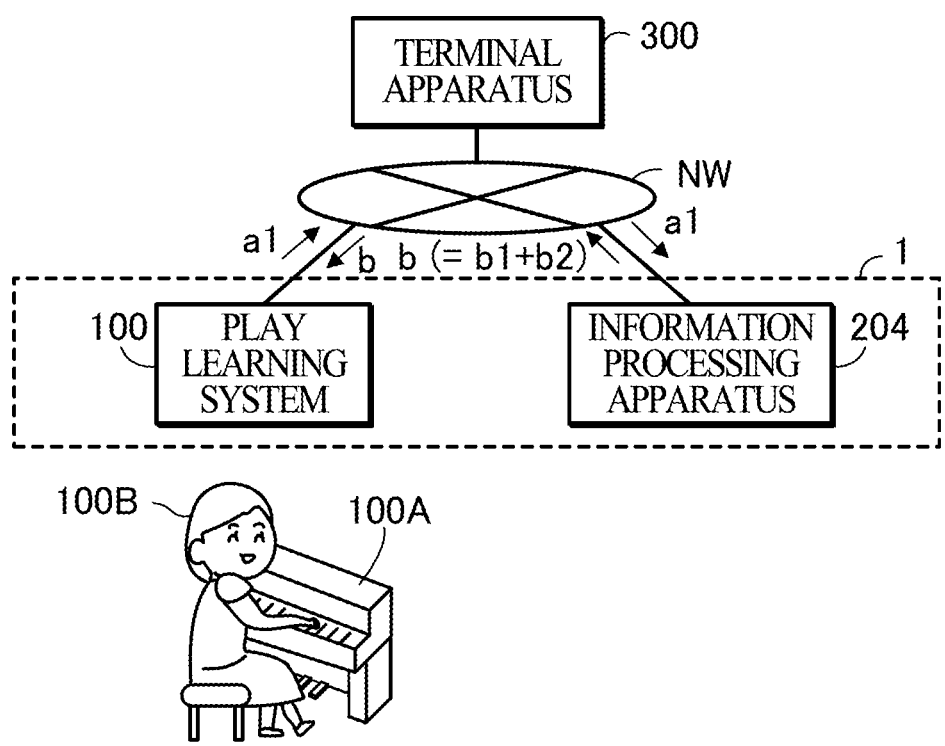
FIG. 20 is a diagram showing a thirteenth modification.

For example, the data acquirer 242 transmits first comment information indicative of a first comment to a terminal apparatus 300 shown in FIG. 20. The terminal apparatus 300 is, for example, a smartphone, a tablet or a notebook personal computer. The terminal apparatus 300 is an electronic device used by a teacher. The teacher teaches how to play the musical instrument 100A. The teacher, for example, is at a remote location. The first comment is a comment indicated by training output data (second information) in an unfixed piece of training data. The first comment is, for example, a comment "You made a mistake in chord." The first comment is generated, for example, by a developer of the information processing system 1.

The teacher executes input to the terminal apparatus 300 to change the first comment "You made a mistake in chord" into a second comment "Attention to a chord error." The second comment is an appropriate comment that is used by the teacher. The terminal apparatus 300 generates second comment information indicative of the second comment by changing the first comment information based on the input from the teacher. After generating the second comment information, the terminal apparatus 300 transmits the second comment information (second comment) to the information processing apparatus 204.

The data acquirer 242 receives the second comment information (second comment) from the terminal apparatus 300. The data acquirer 242 changes the training output data (second information) in the unfixed piece of training data from the first comment information to the second comment information indicative of the second comment and then the data acquirer 242 fixes the unfixed piece of training data.

In this case, it is possible to use comment information indicative of a comment of a teacher that is at a remote location. The teacher may not be at a remote location.

C: Aspects Derivable from the Embodiment and the Modifications Described Above

The following configurations are derivable from at least one of the embodiment and the modifications described above.

C1: First Aspect

An information processing method according to one aspect (first aspect) of the present disclosure is a computer-implemented information processing method that includes: receiving image information indicative of imagery of a first player using a musical instrument; and determining comment information indicative of a comment for the first player based on the image information. According to this aspect, the comment information is determined based on the image information. Therefore, it is possible to determine the comment information indicative of a comment appropriate to imagery of a first player playing the musical instrument.

C2: Second Aspect

In an example (second aspect) of the first aspect, the determining the comment information includes: extracting, from the image information, feature information indicative of a positional relationship between the musical instrument and the first player; and determining the comment information based on the feature information. According to this aspect, the comment information is determined based on the feature information extracted from the image information. Therefore, it is possible to determine the comment information indicative of a comment appropriate to the positional relationship between the musical instrument and the first player.

C3: Third Aspect

In an example (third aspect) of the second aspect, the feature information indicates, as the positional relationship, how to use the first player's body in relation to the musical instrument. According to this aspect, it is possible to determine the comment information indicative of a comment appropriate to how to use the first player's body in relation to the musical instrument.

C4: Fourth Aspect

In an example (fourth aspect) of the second aspect or the third aspect, the determining the comment information based on the feature information includes: inputting the feature information into a first trained model, the first trained model having been trained to learn a relationship between training-feature information and training-comment information, the training-feature information being indicative of a positional relationship between the musical instrument and a second player using the musical instrument, and the training-comment information being indicative of a comment on the positional relationship indicated by the training-feature information; and determining, as the comment information, information output from the first trained model in response to the feature information. According to this aspect, the trained model is used to determine the comment information. Therefore, the comment information can indicate an appropriate comment with a high probability.

C5: Fifth Aspect

In an example (fifth aspect) of the fourth aspect, the information processing method further includes: transmitting first comment information indicative of a first comment to a terminal apparatus used by a teacher, the teacher teaching how to play the musical instrument; and receiving a second comment generated by the terminal apparatus, the terminal apparatus modifying the first comment information based on input from the teacher. In the information processing method, the training-comment information indicates the second comment. According to this aspect, it is possible to use a teacher's comments even if the teacher is in a remote location.

C6: Sixth Aspect

In an example (sixth aspect) of the fourth aspect or the fifth aspect, the first trained model includes a plurality of first-trained models for respective musical instruments, and the method further includes acquiring musical instrument information indicative of the musical instrument; and identifying, from among the plurality of first-trained models, a first trained model that corresponds to the musical instrument indicated by the musical instrument information, in which the determining the comment information based on the feature information includes determining, as the comment information, information output from the identified first trained model in response to the feature information being input into the identified first trained model. According to this aspect, it is possible to determine an appropriate comment for each musical instrument.

C7: Seventh Aspect

In an example (seventh aspect) of the sixth aspect, the information processing method further includes identifying the musical instrument information by using related information related to the musical instrument, in which the identifying the first trained model includes identifying, from among the plurality of first-trained models, the first trained model that corresponds to the musical instrument indicated by the identified musical instrument information. According to this aspect, it is possible to determine an appropriate comment information based on the related information related to the musical instrument.

C8: Eighth Aspect

In an example (eighth aspect) of the seventh aspect, the related information includes: information indicative of sounds emitted from the musical instrument; information indicative of imagery of the musical instrument; information indicative of a musical score for the musical instrument; or information indicative of a combination of the musical instrument and a lesson schedule for the musical instrument. According to this aspect, it is possible to use various kinds of information as the related information.

C9: Ninth Aspect

In an example (ninth aspect) of the seventh aspect, the identifying the musical instrument information includes: inputting the related information into a second trained model, the second trained model having been trained to learn a relationship between training-related information and training-musical instrument information, the training-related information being related to the musical instrument, and the training-musical instrument information being indicative of a musical instrument specified from the training-related information; and identifying, as the musical instrument information, information output from the second trained model in response to the related information. According to this aspect, the musical instrument information is identified by using a trained model. Therefore, the musical instrument information can indicate a musical instrument, which is played by a first player, with high accuracy.

C10: Tenth Aspect

In an example (tenth aspect) of the seventh aspect, the identifying the musical instrument information includes identifying, as the musical instrument information, reference-musical instrument information associated with the related information by referring to a table indicative of associations between reference-related information related to the musical instrument and the reference-musical instrument information indicative of the musical instrument. According to this aspect, it is possible to identify musical instrument information without using a trained model.

C11: Eleventh Aspect

In an example (eleventh aspect) of any one of the first to tenth aspects, the comment information indicates advice on use of the first player's body in relation to the musical instrument. According to this aspect, it is possible to determine advice on use of the first player's body in relation to the musical instrument.

C12: Twelfth Aspect

In an example (twelfth aspect) of the second aspect, the determining the comment information based on the feature information includes determining the comment information based on the feature information and on information indicative of sounds emitted from the musical instrument in a state in which the first player plays the musical instrument. According to this aspect, the comment information is determined based on the information, which indicates the sounds emitted from the musical instrument, and the feature information. Therefore, it is possible to determine an appropriate comment.

C13: Thirteenth Aspect

An information processing system according to another aspect (thirteenth aspect) of the present disclosure includes: at least one memory configured to store instructions; and at least one processor configured to implement the instructions to determine, based on image information indicative of imagery of a first player using a musical instrument, comment information indicative of a comment for the first player. According to this aspect, the comment information is determined based on the image information. Therefore, it is possible to determine the comment information indicative of an appropriate comment.

C14: Fourteenth Aspect

A program according to yet another aspect (fourteenth aspect) of the present disclosure is a non-transitory computer-readable recording medium storing a program executable by at least one processor to execute an information processing method, the method including: receiving image information indicative of imagery of a first player, the first player using a musical instrument; and determining comment information indicative of a comment for the first player based on the image information. According to this aspect, the comment information is determined based on the image information.

Therefore, it is possible to determine the comment information indicative of an appropriate comment.

DESCRIPTION OF REFERENCE SIGNS

1 . . . information processing system, 100 . . . play learning system, 100A . . . musical instrument, 100B . . . user, 110 . . . camera, 130 . . . display, 140 . . . loudspeaker, 150 . . . operating device, 160 . . . communication device, 170 . . . storage device, 180 . . . processor, 181 . . . transmission controller, 182 . . . output controller, 200 to 204 . . . information processing apparatus, 210 . . . communication device, 220 . . . storage device, 230 . . . processor, 231 . . . extractor, 232 . . . determiner, 233 . . . trained model, 233a . . . training target model, 234 . . . transmitter, 235 . . . trained model, 236 . . . identifier, 237 to 238 . . . trained model, 241 . . . training processor, 242 . . . data acquirer, 243 . . . trainer.

What is claimed is:

1. A computer-implemented information processing method comprising:
receiving image information comprising imagery of a first player using a musical instrument;
determining comment information comprising a comment for the first player based on the image information, wherein determining the comment information further comprises:
extracting, from the image information, feature information regarding the musical instrument and/or the first player;
inputting the feature information into a first trained model, the first trained model having been trained to learn a relationship between training-feature information and training-comment information; and
determining, as the comment information, information output from the first trained model in response to the feature information;
transmitting first comment information comprising a first comment to a terminal apparatus used by a teacher;
receiving a second comment generated at the terminal apparatus, the terminal apparatus modifying the first comment information based on input from the teacher; and
updating the training-comment information based on the second comment.

2. The information processing method according to claim 1,
wherein the feature information relates to a positional relationship between the musical instrument and the first player.

3. The information processing method according to claim 2, wherein
the feature information indicates, as the positional relationship, how to use the first player's body in relation to the musical instrument.

4. The information processing method according to claim 2, wherein the training-feature information relates to a positional relationship between the musical instrument and a second player using the musical instrument, and the training-comment information relates to a comment on the positional relationship indicated by the training-feature information.

5. The information processing method according to claim 4,
wherein the first trained model includes a plurality of first-trained models for respective musical instruments, the method further comprising:
acquiring musical instrument information relating to the musical instrument; and
identifying, from among the plurality of first-trained models, the first trained model, wherein the first trained model corresponds to the musical instrument indicated by the musical instrument information,
wherein determining the comment information based on the feature information includes determining, as the comment information, information output from the identified first trained model in response to the feature information being input into the identified first trained model.

6. The information processing method according to claim 5,
further comprising identifying the musical instrument information by using related information related to the musical instrument,
wherein identifying the first trained model includes identifying, from among the plurality of first-trained models, the first trained model that corresponds to the musical instrument indicated by the identified musical instrument information.

7. The information processing method according to claim 6, wherein the related information includes:
information relating to sounds emitted from the musical instrument;
information relating to imagery of the musical instrument;
information relating to a musical score for the musical instrument; or
information relating to a combination of the musical instrument and a lesson schedule for the musical instrument.

8. The information processing method according to claim 6, wherein identifying the musical instrument information includes:
inputting the related information into a second trained model, the second trained model having been trained to learn a relationship between training-related information and training-musical instrument information, the training-related information being related to the musical instrument, and the training-musical instrument information relating to a musical instrument specified from the training-related information; and identifying, as the musical instrument information, information output from the second trained model in response to the related information.

9. The information processing method according to claim 6, wherein identifying the musical instrument information includes identifying, as the musical instrument information, reference-musical instrument information associated with the related information by referring to a table of associations between reference-related information related to the musical instrument and the reference-musical instrument information relating to the musical instrument.

10. The information processing method according to claim 2, wherein determining the comment information based on the feature information includes determining the comment information based on the feature information and on information relating to sounds emitted from the musical instrument in a state in which the first player plays the musical instrument.

11. The information processing method according to claim 1, wherein the comment information indicates advice on use of the first player's body in relation to the musical instrument.

12. An information processing system comprising:
at least one memory configured to store instructions; and
at least one processor configured to execute the instructions to:
receive image information comprising imagery of a first player using a musical instrument;
extract, from the image information, feature information regarding the musical instrument and/or the first player;
input the feature information into a first trained model, the first trained model having been trained to learn a relationship between training-feature information and training-comment information;
determine, as first comment information for the first player, information output from the first trained model in response to the feature information;
transmit the first comment information comprising a first comment to a terminal apparatus used by a teacher;
receive a second comment generated at the terminal apparatus, the terminal apparatus modifying the first comment based on input from the teacher; and
update the training-comment information based on the second comment.

13. A computer-implemented information processing method comprising:
receiving image information comprising imagery of a first player using a musical instrument;
acquiring related musical instrument information;
inputting the related musical instrument information into a second trained model having been trained to learn a relationship between training-related musical instrument information and training-musical instrument identification information;
identifying, as the musical instrument identification information, information output from the second trained model in response to the related musical instrument information;
identifying, from among a plurality of first-trained models, a first trained model, wherein the first trained model corresponds to the musical instrument indicated by the musical instrument identification information; and
determining comment information comprising a comment for the first player based on the image information, wherein determining the comment information further comprises:
extracting, from the image information, feature information regarding the musical instrument and/or the first player;
inputting the feature information into the first trained model, the first trained model having been trained to learn a relationship between training-feature information and training-comment information; and
determining, as the comment information, information output from the first trained model in response to the feature information.

14. The information processing method according to claim 13, wherein the related musical instrument information includes:
information relating to sounds emitted from the musical instrument;
information relating to imagery of the musical instrument;
information relating to a musical score for the musical instrument; or
information relating to a combination of the musical instrument and a lesson schedule for the musical instrument.

* * * * *